US012664149B2

(12) United States Patent
Bhosale et al.

(10) Patent No.: US 12,664,149 B2
(45) Date of Patent: Jun. 23, 2026

(54) SYSTEM, APPARATUS, AND METHOD FOR MAINTAINING DATA QUALITY USING AUTOMATIC TIMELINESS VERIFICATION MECHANISMS

(71) Applicant: Morgan Stanley Services Group Inc., New York, NY (US)

(72) Inventors: Rishikesh Pramod Bhosale, New York, NY (US); Rakesh Harish, West New York, NJ (US); Suprima Bhele, Hoboken, NJ (US); Gyorgy Takats, Stamford, CT (US); Raheel Nazir, New York, NY (US); Anoop Chand Katoch, Alpharetta, GA (US); Edward Gildersleeve, Lake Grove, NY (US); Niraj Kumar, Bengaluru (IN); Krithika Venkat, Edison, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/981,065

(22) Filed: Dec. 13, 2024

(65) Prior Publication Data

US 2025/0110945 A1 Apr. 3, 2025

Related U.S. Application Data

(63) Continuation-in-part of application No. 18/332,222, filed on Jun. 9, 2023, now abandoned.

(51) Int. Cl.
*G06F 16/23* (2019.01)
*G06F 16/22* (2019.01)
*G06F 16/26* (2019.01)

(52) U.S. Cl.
CPC ...... *G06F 16/2365* (2019.01); *G06F 16/2282* (2019.01); *G06F 16/26* (2019.01)

(58) Field of Classification Search
CPC ................. G06F 16/2365; G06F 16/26; G06F 16/2282
See application file for complete search history.

(56) References Cited

U.S. PATENT DOCUMENTS 8,856,071 B2 * 10/2014 Golab ............... G06F 16/24532
707/618
9,390,112 B1 7/2016 Daly
(Continued)

FOREIGN PATENT DOCUMENTS

CN 12712113 A 4/2021

*Primary Examiner* — Sherief Badawi
*Assistant Examiner* — J Mitchell Curran
(74) *Attorney, Agent, or Firm* — Leason Ellis LLP

(57) ABSTRACT

A system and method for maintaining data quality, including: periodically updating, at a first computing apparatus, a source data table maintained at a second computing apparatus at a first time interval; periodically updating, in an iterative or recursive manner at the first computing apparatus, a batch data table maintained at the second computing apparatus at a second time interval; obtaining, at the second computing apparatus from an information system, one or more data tables, metadata, and one or more transaction tables; determining, at the second computing apparatus, whether a refresh timestamp or a modification timestamp is within a predetermined time period from a timestamp of the one or more transaction tables; when it is within the predetermined time period, updating a data visualization application for reviewing the timestamp negative result, wherein the data visualization application comprises a graphical user interface that is accessible using a third computing apparatus.

14 Claims, 18 Drawing Sheets

1000

(56)         References Cited

U.S. PATENT DOCUMENTS

| | | | |
|---|---|---|---|
| 9,547,824 B2 | 1/2017 | Indeck et al. | |
| 10,503,574 B1 | 12/2019 | Lisuk | |
| 10,909,109 B1 * | 2/2021 | Kambhampati | .... G06F 16/2282 |
| 11,507,445 B2 | 11/2022 | Thomas et al. | |
| 2011/0196880 A1 * | 8/2011 | Soules | ............... G06F 16/2453 |
| | | | 707/812 |
| 2016/0210303 A1 | 7/2016 | Anand | |
| 2016/0267082 A1 | 9/2016 | Wong et al. | |
| 2018/0246912 A1 | 8/2018 | Arning | |
| 2019/0057127 A1 * | 2/2019 | Furukawa | ............... G06F 16/26 |
| 2019/0370367 A1 * | 12/2019 | Gal | ...................... H04L 67/535 |
| 2020/0183899 A1 | 6/2020 | Xu | |
| 2021/0286663 A1 | 9/2021 | Thomas et al. | |
| 2022/0374442 A1 * | 11/2022 | Kaspa | ...................... G06N 5/04 |

* cited by examiner

400

DQ Report 601

| TABLE NAME | COLUMN ID | COLUMN NAME | RESULT |
|---|---|---|---|
| _POSITION_BALANCE_ACCT_WKLY | 001001 | ACCT_ID | PASS |
| _POSITION_BALANCE_ACCT_WKLY | 001002 | AVG_TOTL_AUM_AMT_26W | PASS |
| _POSITION_BALANCE_ACCT_WKLY | 001003 | MAX_BAL_MRGN_RATIO_1W | FAIL |
| ...... | ...... | ...... | ...... |
| ...... | ...... | ...... | ...... |
| ...... | ...... | ...... | ...... |
| _REVENUE_AGG_HHLD_MNTLY | 045012 | MRGN_REV_AMT_1M | FAIL |
| _REVENUE_AGG_HHLD_MNTLY | 045013 | MRGN_REV_AMT_12M | PASS |

View Report (DQ Report))

FIG. 6A

DQ Tabular Report 701

| TABLE NAME | COLUMN ID | COLUMN NAME | FILL RATE | CONTINUOUS _SUM_P _CT | ....... | DISCRETE AVG_UNIQUE_CNT | RESULT |
|---|---|---|---|---|---|---|---|
| _POSITION_BALANCE _ACCT_WKLY | 001001 | ACCT_ID | 1.6945535 | - | ....... | 2.018882444 | FAIL |
| _POSITION_BALANCE_ ACCT_WKLY | 001002 | AVG_TOTL_ AUM_A MT_26W | 0.3949560 | 5 | ....... | , | FAIL |
| _POSITION_ BALANCE_ACCT _WKLY | 001003 | ENRGY_SECTR _AMT | 0 | 4 | ....... | , | FAIL |
| ....... | ... | ....... | ....... | ....... | ....... | ....... | ....... |
| ....... | ... | ....... | ....... | ....... | ....... | ....... | ....... |
| _REVENUE_AGG_ HHLD_MN TLY | 045012 | MRGN_REV_ AMT_1 M | 0 | 23 | ....... | - | FAIL |

RefreshDate
2022-07-03 ∨

Tables
ALL ∨

Data Type Category
☑ Categorical
☑ Continuous
☑ Discrete ∨

Result
☑ Fail
☐ Pass

800 s1001: obtain delta records in system data according to latest timestamp s1002: lookup target source batch data table s1003: compare delta records to target table records, delta?

N

Y s1005: insert delta record s1006: exclude update s1007: update latest timestamp

1000

SYSTEM, APPARATUS, AND METHOD FOR MAINTAINING DATA QUALITY USING AUTOMATIC TIMELINESS VERIFICATION MECHANISMS

CROSS-REFERENCE TO RELATED APPLICATIONS

This application is a continuation-in-part of and claims the benefit of U.S. patent application Ser. No. 18/332,222, filed Jun. 9, 2023, the entire contents of which are incorporated by reference herein.

FIELD

The present disclosure generally relates to data processing and, more specifically, to an improved automatic data quality validation technique to validate large volumes of time-sensitive data efficiently and accurately.

BACKGROUND

Data is a fundamental block for executing any project to deliver high performing results. For example, in the field of financial investments and transactions, data analysis can be a critical part in planning, decision making, and execution. However, when the quality of the data is low, the attendant analytics, data science, and the overall output becomes less effective. With the continued developments in computer-implemented analytical tools and processes, the amount of data produced continues to increase substantially. As a result, the need for maintaining data quality in an accurate, timely, and efficient manner becomes even more important.

SUMMARY

The present disclosure provides an improved automatic data quality assurance process that addresses an ongoing need for an efficient and accurate technique that ensures quality of large volumes of accumulated data.

In accordance with one or more example implementations of the present disclosure, a system comprises: an information system; a first computing apparatus; and a second computing apparatus adapted to maintain a source data table and a batch data table, wherein the first computing apparatus is adapted to: periodically update the source data table at a first time interval, comprising: obtaining, from the second computing apparatus, updated system data and the source data table; identifying one or more of a new record, a changed record, and an expired record in the updated system data obtained from the database server; when a new record is identified, inserting the new record to the source data table; when a changed record is identified, updating the changed record in the source data table; and when an expired record is identified, deleting the expired record from the source data table; periodically update, in an iterative or recursive manner, the batch data table at a second time interval, comprising: obtaining, from the second computing apparatus, one or more delta records in the updated system data according to a latest timestamp and the batch data table; comparing the one or more delta records obtained from the database server to one or more corresponding target table records in the batch data table; when the comparing identifies a delta between the one or more delta records and the batch data table, inserting the one or more delta records to the batch data table; when the comparing fails to identify a correspondence between the one or more delta records and the batch data table, excluding the one or more delta records from the batch data table; and updating the latest timestamp for a next iteration of the updating of the batch data table; the second computing apparatus is adapted to: obtain, from the information system, one or more data tables and metadata corresponding to the one or more data tables; obtain one or more transaction tables corresponding to the one or more data tables; determine whether a refresh timestamp or a modification timestamp associated with the one or more data tables is within a predetermined time period from a timestamp associated with the one or more transaction tables; when it is determined that the refresh timestamp or the modification timestamp associated with the one or more data tables is within the predetermined time period from the timestamp associated with the one or more transaction tables, record a timestamp positive result in a profile result table; and when it is determined that the refresh timestamp or the modification timestamp associated with the one or more data tables is not within the predetermined time period from the timestamp associated with the one or more transaction tables, record a timestamp negative result in the profile result table and update a data visualization application for reviewing the timestamp negative result, wherein the data visualization application comprises a graphical user interface that is accessible using a third computing apparatus for reviewing and confirming the timestamp negative result.

In one or more exemplary implementations, one or more data points associated with a confirmed negative result is excluded from a data trend calculation at the second computing apparatus.

In one or more exemplary implementations, the first time interval is greater than the second time interval.

In one or more exemplary implementations, the first time interval is one week, the second time interval is twenty four (24) hours., and the predetermined time period is between forty eight (48) hours and ninety six (96) hours.

In one or more exemplary implementations, the second computing apparatus is further adapted to: construct the profile result table based on one or more completed record updates in a latest iteration of the updating of the batch data table; determine whether one or more parameters are defined for updated data included in the one or more completed record updates; when it is determined that one or more parameters are defined for the updated data, determine whether the updated data conforms to the one or more defined parameters; when it is determined that the updated data conforms to the one or more defined parameters, record a defined parameter positive result in the profile result table; when it is determined that the updated data fails to conform to the one or more defined parameters, record a defined parameter negative result in the profile result table and update the data visualization application for reviewing the defined parameter negative result; when it is determined that no parameters are defined for the updated data, determine whether the updated data conforms to one or more rule-based logic thresholds; when it is determined that the updated data conforms to the one or more rule-based logic thresholds, record a logic threshold positive result in the profile result table; and when it is determined that the updated data fails to conform to the one or more rule-based logic thresholds, record a logic threshold negative result in the profile result table and update the data visualization application for reviewing the logic threshold negative result.

In one or more exemplary implementations, the second computing apparatus is further adapted to: construct the profile result table based on one or more completed record updates in a latest iteration of the updating of the batch data table; determine whether the updated data conforms to one or more rule-based logic thresholds; when it is determined that the updated data conforms to the one or more rule-based logic thresholds, record a logic threshold positive result in the profile result table; and when it is determined that the updated data fails to conform to the one or more rule-based logic thresholds, record a logic threshold negative result in the profile result table and update the data visualization application for reviewing the logic threshold negative result.

In one or more exemplary implementations, the one or more rule-based logic thresholds comprise a z-score logic threshold.

In one or more exemplary implementations, the second computing apparatus is further adapted to: upon recording the timestamp negative result in the profile result table, issue a notification to one or more user accounts with a subscription to a data table associated the timestamp negative result.

In accordance with one or more example implementations of the present disclosure, a method comprises: periodically updating, at a first computing apparatus, a source data table maintained at a second computing apparatus at a first time interval, comprising: obtaining, from the second computing apparatus, updated system data and the source data table; identifying one or more of a new record, a changed record, and an expired record in the updated system data obtained from the database server; when a new record is identified, inserting the new record to the source data table; when a changed record is identified, updating the changed record in the source data table; and when an expired record is identified, deleting the expired record from the source data table; periodically updating, in an iterative or recursive manner at the first computing apparatus, a batch data table maintained at the second computing apparatus at a second time interval, comprising: obtaining, from the second computing apparatus, one or more delta records in the updated system data according to a latest timestamp and the batch data table; comparing the one or more delta records obtained from the database server to one or more corresponding target table records in the batch data table; when the comparing identifies a delta between the one or more delta records and the batch data table, inserting the one or more delta records to the batch data table; when the comparing fails to identify a correspondence between the one or more delta records and the batch data table, excluding the one or more delta records from the batch data table; and updating the latest timestamp for a next iteration of the updating of the batch data table; obtaining, at the second computing apparatus from the information system, one or more data tables and metadata corresponding to the one or more data tables; obtaining, at the second computing apparatus, one or more transaction tables corresponding to the one or more data tables; determining, at the second computing apparatus, whether a refresh timestamp or a modification timestamp associated with the one or more data tables is within a predetermined time period from a timestamp associated with the one or more transaction tables; when it is determined that the refresh timestamp or the modification timestamp associated with the one or more data tables is within the predetermined time period from the timestamp associated with the one or more transaction tables, recording a timestamp positive result in a profile result table; and when it is determined that the refresh timestamp or the modification timestamp associated with the one or more data tables is not within the predetermined time period from the timestamp associated with the one or more transaction tables, recording a time-stamp negative result in the profile result table and updating a data visualization application for reviewing the timestamp negative result, wherein the data visualization application comprises a graphical user interface that is accessible using a third computing apparatus for reviewing and confirming the timestamp negative result.

In one or more exemplary implementations, one or more data points associated with a confirmed negative result is excluded from a data trend calculation at the second computing apparatus.

In one or more exemplary implementations, the first time interval is greater than the second time interval.

In one or more exemplary implementations, the first time interval is one week, the second time interval is twenty four (24) hours., and the predetermined time period is between forty eight (48) hours and ninety six (96) hours.

In one or more exemplary implementations, the method further comprises: constructing, at the second computing apparatus, the profile result table based on one or more completed record updates in a latest iteration of the updating of the batch data table; determining, at the second computing apparatus, whether one or more parameters are defined for updated data included in the one or more completed record updates; when it is determined that one or more parameters are defined for the updated data, determining whether the updated data conforms to the one or more defined parameters; when it is determined that the updated data conforms to the one or more defined parameters, recording a defined parameter positive result in the profile result table; when it is determined that the updated data fails to conform to the one or more defined parameters, recording a defined parameter negative result in the profile result table and updating the data visualization application for reviewing the defined parameter negative result; when it is determined that no parameters are defined for the updated data, determining whether the updated data conforms to one or more rule-based logic thresholds; when it is determined that the updated data conforms to the one or more rule-based logic thresholds, recording a logic threshold positive result in the profile result table; and when it is determined that the updated data fails to conform to the one or more rule-based logic thresholds, recording a logic threshold negative result in the profile result table and updating the data visualization application for reviewing the logic threshold negative result.

In one or more exemplary implementations, the method further comprises: constructing, at the second computing apparatus, the profile result table based on one or more completed record updates in a latest iteration of the updating of the batch data table; determining, at the second computing apparatus, whether the updated data conforms to one or more rule-based logic thresholds; when it is determined that the updated data conforms to the one or more rule-based logic thresholds, recording a logic threshold positive result in the profile result table; and when it is determined that the updated data fails to conform to the one or more rule-based logic thresholds, recording a logic threshold negative result in the profile result table and updating the data visualization application for reviewing the logic threshold negative result.

In one or more exemplary implementations, the one or more rule-based logic thresholds comprise a z-score logic threshold.

In one or more exemplary implementations, the method further comprises: upon recording the timestamp negative result in the profile result table, issuing, at the second computing apparatus, a notification to one or more user accounts with a subscription to a data table associated the timestamp negative result.

BRIEF DESCRIPTION OF THE DRAWINGS

Various example implementations of this disclosure will be described in detail, with reference to the following figures, wherein:

FIGS. 6A, 6B, and 6C form an illustration of a GUI for presenting specific DQ information according to an example implementation of the present disclosure.

FIG. 7 is an illustration of a GUI for presenting a DQ tabular report according to an example implementation of the present disclosure.

DETAILED DESCRIPTION

As an overview, the present disclosure generally concerns a computer-implemented automatic data quality assurance process that addresses an ongoing need for an efficient and accurate technique for ensuring quality of large volumes of accumulated data.

The following example implementation is described based on features related to financial transaction data, of which can be incorporated into other types of high-volume data without departing from the spirit and the scope of the disclosure.

In finance, institutions—such as brokerages, banks, exchanges, to name a few—and their respective departments handle extremely large volumes of data associated with transactions, accounts, and the like. The volume is ever increasing with the continued developments in computerized transactions. Data analysis and data deviation detection are key elements in detecting possible failures and in ensuring the health of an operation. As an example, volatility associated with an operation is a factor in detecting possible failures and for programming remedial strategies.

Figure 1:
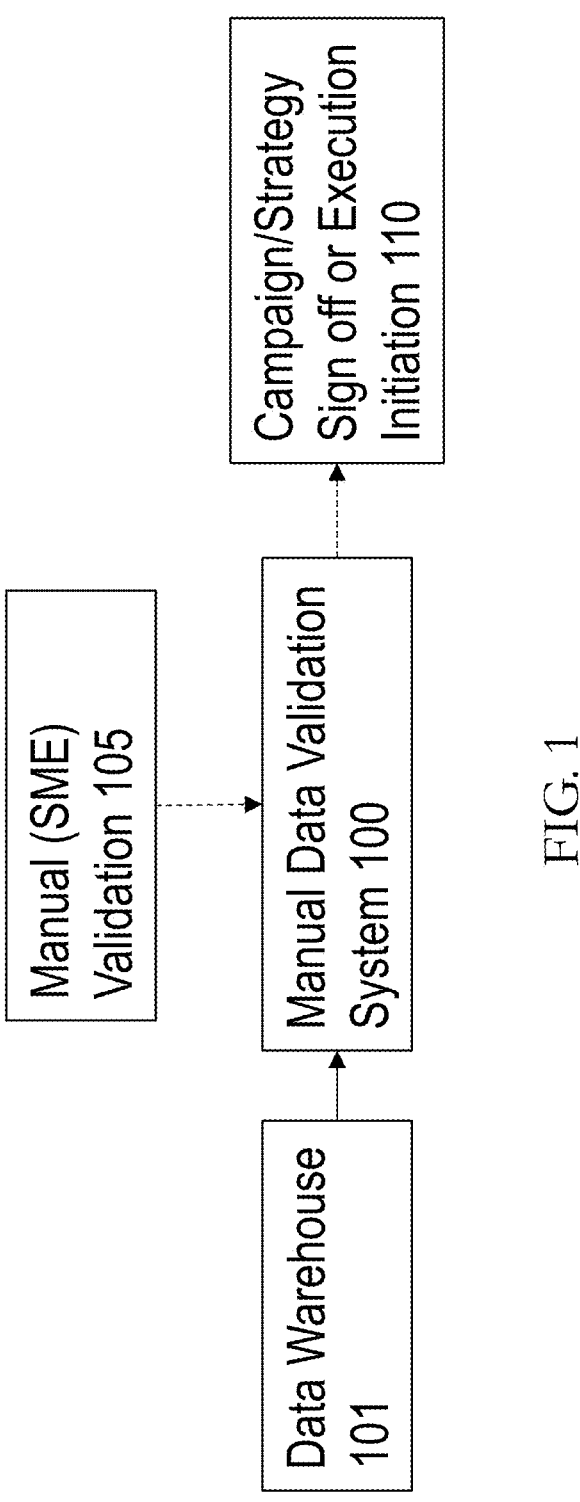
FIG. 1 is a schematic diagram of a manual data validation system for comparison with the improved system and process of the present disclosure.

To maintain data quality, the present disclosure includes an original technique that relies upon subject matter experts (SMEs) to periodically review data outputs and provide feedback for appropriately analyzing the data. As an example, FIG. 1 is a schematic diagram for a manual data validation system 100 that retrieves data to be validated from a data warehouse 101 and provides an interface for receiving manual validation inputs 105 from SMEs and/or other operators for setting appropriate parameters for data analysis and for validating the data quality for attendant analyses. Inputs 105 can include a data element count match, a trend determination (for example, null trend and the like), baseline metric assignment, and other parameter validations by a SME, to name a few. In one example, a SME might provide curated SQL statements to generate thresholds on the data attributes. Once the validation is completed, system 100 issues a sign off or execution initiation 110 of a corresponding campaign or strategy based on the data analysis.

In utilizing the original technique, data quality is assured but system 100 requires a time-consuming effort and demands inordinate manpower. For example, validation 105 would often require multiple iterations to ensure validation, which can result in delays for initiation 110. In the context of a financial institution, a transactional period for a typical institution can include thousands of data categories and variables in need of validation within a short period of time and with limited SME resources available. As an example, analysis for the end of a market week for implementing strategies for a following week can include large volumes of data that require validation by one or more SMEs over a short period of time—e.g., a weekend.

The present disclosure recognizes the following disadvantages of validation system 100: significant manual overhead, dependency on SMEs for SQL or queries, dependency on SMEs for valid deviations, slower validations, iterations covering all attributes in a data set resulting in slower implementations, lag in parameter refreshes, static or stale parameters/thresholds by SMEs, frequent false positives/failures detected, to name a few. Accordingly, the present disclosure provides a technological solution to the disadvantages of system 100 and generally relates to a computer-implemented method of automatically adjusting data parameters or thresholds using technical analyses on historical trends for respective data elements to account for changes in value volatility of the data elements.

Figure 2:
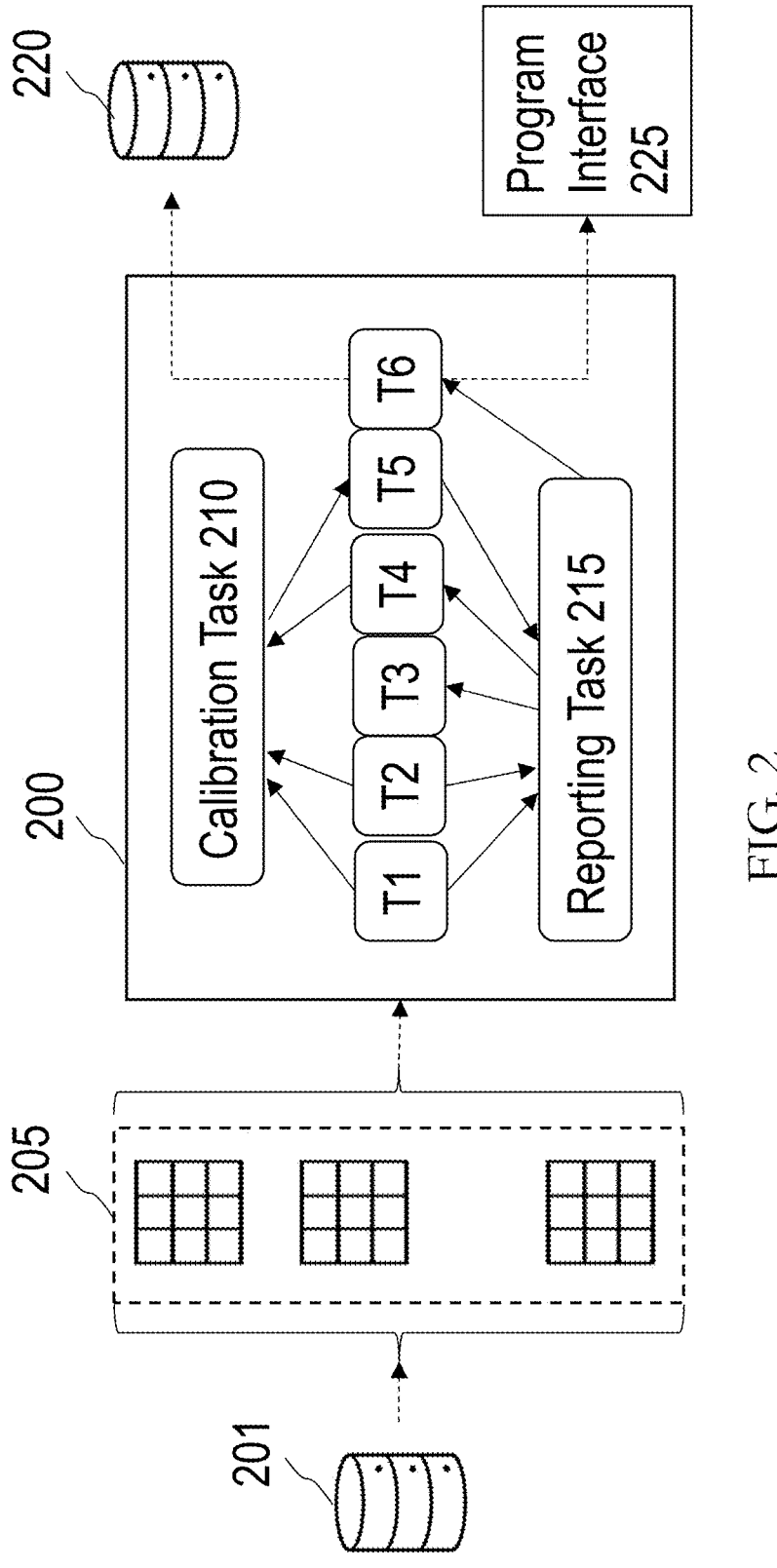
FIG. 2 is a schematic diagram of a data validation system in accordance with an example implementation of the present disclosure.

FIG. 2 is a schematic diagram of a data validation system 200 in accordance with an example implementation of the present disclosure. As illustrated in FIG. 2, system 200 is communicatively connected to a data source 201 and is adapted to retrieve raw data 205 for data quality (DQ) processing. In embodiments, data source 201 can be embodied by one or more information systems (see FIG. 4) incorporating an electronic data warehouse (EDW) for storing electronic data associated with an operation, for example, of a financial institution. Thus, data source 201 comprises data that is recorded regularly—for example, periodically at a fixed interval (e.g., daily, weekly, biweekly, and monthly) and/or transactionally at variable intervals—in correspondence with the operation. In embodiments, the information system(s) and EDW can be implemented using one or more networks (see FIG. 4).

According to an example implementation of the present disclosure, raw data 205 is in a table and/or database (DB) record form that includes the following non-exhaustive list of columns/parameters: vendor tables/associated columns, date columns, geographical columns, and transaction and related data columns, such as asset under management (AUM), transaction volume, institution identifiers (IDs) or codes, ETF flags, account ID, user ID, run date, interaction date, and the like. In one implementation, the columns/parameters are categorized into four (4) general data types in relation to a need for quality measurements: continuous, categorical, discrete, and datetime. Additionally, data 205 can include out of scope data that is not subject to DQ validation—for example, in one implementation, geography and date information can be excluded from DQ validation.

The continuous data type represents quantitative data that would require continuous analysis and DQ validation. In embodiments, continuous data can contain periodic, instantaneous, and/or transactional information of data 205. According to one example implementation, AUM and transaction volume are of the continuous data type, for which quality measurements comprise: Fill Rate, Non-Zero Rate, Min, Max, Percentiles (e.g., 10, 25, 50, 75, 90, and 99), Average, and Sum.

The categorical data type represents categories associated with a row and/or DB record in data 205. Thus, the categorical data can, in embodiments, serve to categorize periodic, instantaneous, and/or transactional information contained in corresponding rows and/or DB records of data 205. According to one example implementation, institution IDs/codes and ETF flags are of the categorical data type, for which quality measurements comprise: Fill Rate, Categorical Distribution, and New Category Check.

The discrete data type represents discrete information that require a one-time, or discrete, validation. According to one example implementation, account ID and user ID are of the discrete data type, for which quality measurements comprise: Fill Rate and Unique Counts.

The datetime data type represents date and time information associated with a row and/or DB record, which, again, can contain periodic, instantaneous, and/or transactional information. According to one example implementation, run date and interaction date are of the datetime data type.

The out of scope data type represents qualitative information that might be filtered from quantitative DQ processing. According to one example implementation, vendor tables/associated columns, date columns, and geographical columns are of the out of scope data type.

Returning to FIG. 2, data validation system 200 incorporates a calibration task component 210 and reporting task component 215 that cooperate to generate and maintain a plurality of data tables—T1, T2, T3, T4, T5, and T6—that contain preliminary (T1 and T2), intermediate (T3, T4, and T5), and final (T6) DQ analysis and reporting data of the present disclosure. In embodiments, different numbers of data tables T #can be utilized for various types of source raw data 205 without departing from the spirit and scope of the present disclosure. Components 210 and 215 are software operating components—for example, scripted tasks—that are programmed to process and/or manipulate source data

205 to form data tables T #. In accordance with one example implementation, the data tables contain the following information derived from source data 205:

a. T1: Table reference—A reference table with all source tables (or DB records) from data 205, as well as the refresh frequency, source, lag, and audit date of the T1 table;

b. T2: Column reference—a reference table with all columns from the source tables (or DB records) from data 205, as well as respective attributes of the columns;

c. T3: Volume Trend—a table with volume information of each source table (or DB record) from data 205 for the past x (x>0; e.g., x=21) runs;

d. T4: DQ Trend—A comprehensive table with attributes used for data quality calculations;

e. T5: Threshold Table—A reference table with the calculated differences in data trend statistics at column level; and f. T6: Final Report—A final report table that is derived from the other quality control (QC) tables (T #) at a column level with the final DQ result.

As illustrated in FIG. 2, T1 and T2 embodying source data 205 provide information to calibration task component 210 and reporting task component 215 for their respective operations. Reporting task component is adapted to generate T3 and T4, of which T4 provides information to calibration task component 210 for calibrating relevant thresholds and generating T5. Accordingly, reporting task component 215 generates final report T6 based at least in part on information from T5. According to one example implementation, T6 embodies data that is stored by data validation system 200 at a DQ data storage 220 and/or forwarded to a program interface 225 for output, reporting, and/or further processing. In embodiments, program interface 225 can comprise a data visualization component, a report generation component, a report or visualization scheduler, data processing component, to name a few. In one example implementation, program interface 225 comprises graphical user interface ("GUI") elements—for example, see FIGS. 5, 6, and 7—and/or other user interface elements (not shown) for accepting an input from an operator identifying data to be analyzed. The identification can correspond to regularly recorded raw data 205 from data source 201 and/or output data 322 stored in, for example, DQ data storage 220. Correspondingly, the returned output via program interface 225 comprises analyzed results associated with the calibrated thresholds from DQ data storage 220 and/or generated by system 200.

According to one example implementation, program interface 225 comprises a machine learning (ML) interface for outputting final report data of data validation system 200 to train one or more ML models and/or to process said data using one or more ML models. In one example implementation, a ML model(s) is utilized for an accuracy check on data validation system 200 by conducting a source-to-target validation for all detected failures by system 200 to account for external volatilities that result in highly fluctuating trends, which can affect false failures. Additionally, in embodiments a ML model(s) can be used to automatically read the data signals from system 200 via interface 225, predict out of pattern trends, and automatically recalibrate parameters/thresholds thereof.

Figure 3:
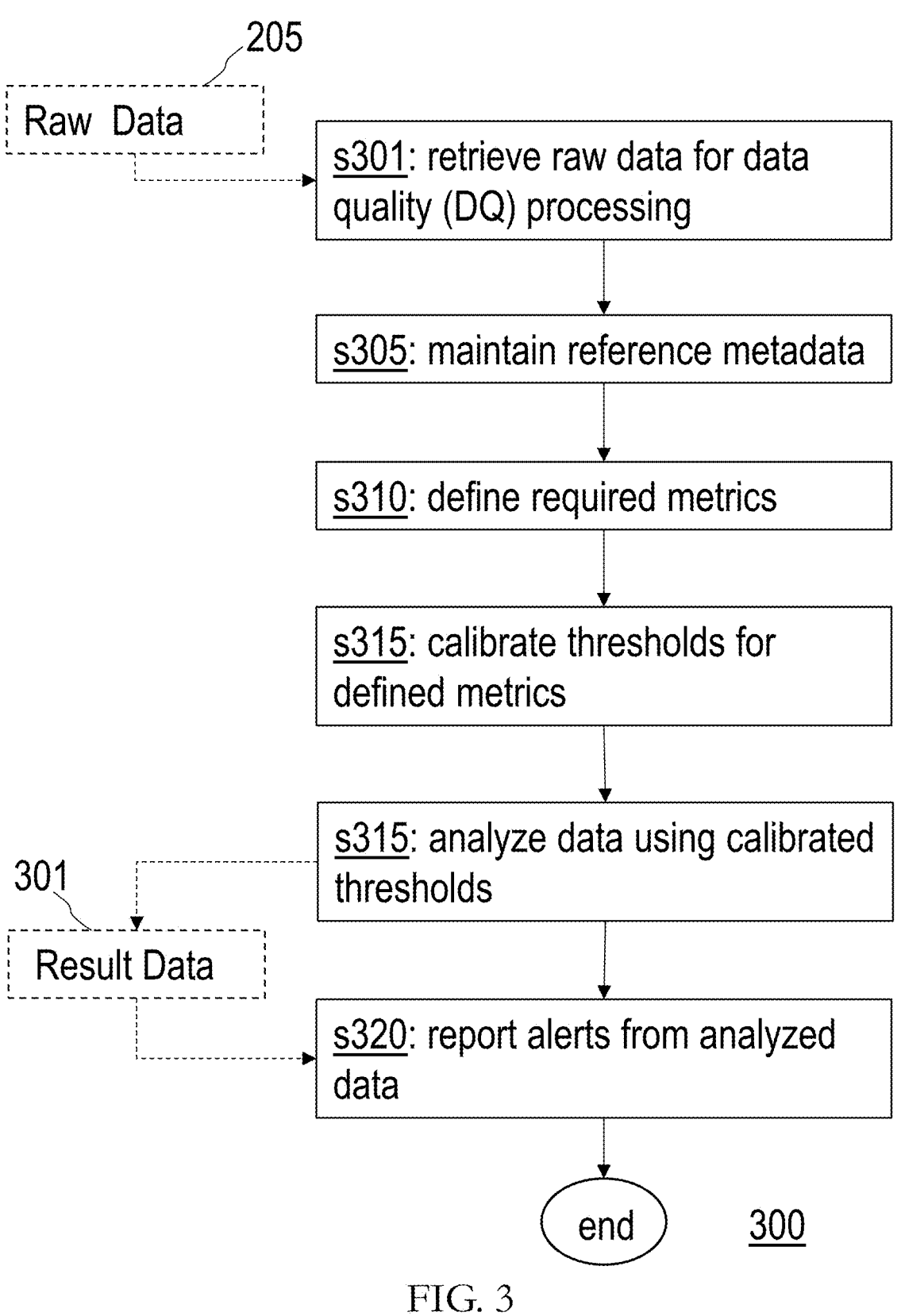
FIG. 3 is a flow diagram of a data quality (DQ) threshold calibration process according to one example implementation of the present disclosure.

FIG. 3 is a flow diagram of a DQ threshold calibration process 300 executed by data validation system 200 according to one example implementation of the present disclosure.

As illustrated in FIG. 3, process 300 initiates with step s301 of system 200 retrieving raw source data 205 from data source 201. According to an example implementation of the present disclosure, step s301 is executed according to pre-programmed instructions by an operator (430 in FIG. 4) through a user interface (420 in FIG. 4), which comprises one or more definitions/identifications of data 205 to be retrieved from data source 201 at a predetermined interval or on an ad hoc basis. In one embodiment, the periodic retrieval of data at step s301, as well as the threshold calibration and data analysis of steps s305 to s320, are conduct according to preprogrammed instructions at a regular interval—for example, daily, weekly, biweekly, and monthly—that is greater than an interval of regularly recording—for example, periodically at a fixed interval and/or transactionally at variable intervals—data 205. Next, at step s305, system 200 maintains reference metadata of the retrieved data 205. In an example implementation, data tables T1 and T2 are generated where table references—such as refresh rate, load type, and the like—and column references—such as name, table, datatype categories, and the like—for which the reference metadata is maintained. In one implementation, system 200 continually maintains new/historical data metrics for all columns.

Process 300 next proceeds to step s310, where system 200 defines required metrics. In accordance with one implementation, standard metrics-such as, Null/Fill rate for all columns, and the like- and specific metrics of each column based on column data type are defined. With reference to FIG. 2, data tables T3 and T4 embody respective specific volume and volatility DQ metrics for corresponding transaction and AUM continuous data types.

With the required metrics defined, system 200 next, at step s315, calibrates thresholds for the defined metrics. According to one example implementation of the present disclosure, a threshold for a data element is determined by using a convoluted moving average model. The convoluted moving average model comprises determining moving central tendencies for the metrics against each respective data category. According to one example implementation, such tendencies are represented by a moving periodic delta ($D_t$) determined according to equation (1) as follows:

$$D_t = \left| \frac{Avg(x_{t-x \ to \ t-y}) - X_t}{Avg(x_{t-x \ to \ t-y})} \right| \%, \qquad (1)$$

where $X_t$ us a data point at a time t,
x is a period preceding t,
y is another period preceding t, and
x>y.

According to one example implementation, x=8 and y=1. In embodiments, the moving periodic delta can be determined over a period other than t-8 to t-1.

Using the moving periodic delta ($D_t$) over a predetermined period—for example, t-x to t-y a threshold ($T_t$) is determined according to equation (2) as follows:

$$T_t = Q3(D_{t-x \ to \ t-y}) + 1.5 * IQR, \qquad (2)$$

where Q3 is the third quartile of the moving periodic deltas $D_{t-x \ to \ t-y}$ determined according to Equation (1), and
IQR is the interquartile range thereof.

In embodiments, the threshold T can be determined based on moving periodic deltas D over a longer or a shorter period—for example, other than x to y.

Thus, at step s315, thresholds are calibrated (or recalibrated on a periodic e.g., monthly—basis) for trend analysis against each defined metric. In one implementation, threshold values ($T_t$) are the outputs that are derived from the above-described central tendencies for period-over-period—e.g., week over week (WoW)—metric(s) comparisons. With reference to FIG. 2, data table T5 embodies the calibrated threshold values ($T_t$) 317 generated at step s315.

With thresholds ($T_t$) calibrated for the defined metrics, process 300 concludes with step s320 of analyzing the retrieved data 205 using these thresholds to generate result data 301, which is used to report alerts from the analyzed data, at step s325. Referring back to FIG. 2, steps s320 and s325 correspond to reporting task component 215 generating data table T6 as output data 322 using data tables T1, T2, and T5 to, thereby, output relevant alert information to DQ data storage 220 and/or program interface 225. Thus, at steps s320 and s325, deviations in new values are compared with the thresholds defined for each metric (upper limit or lower limit thresholds) and a pass/fail result for each column is outputted according to one example implementation of the present disclosure.

With reference to FIGS. 2 and 3, data tables T1-T6 are structurally programmed, and data is pre-loaded to data tables T1-T5, for an initialization of system 200. Thereafter, a periodic (at predetermined intervals, e.g., weekly) execution of process 300 for retrieving source data 205 (step s301), reporting data tables T1 and T2, and updating data tables T3, T4, and T6 (steps s305-s320) is undertaken using reporting task component 215. Separately, data tables T1 and T2 are periodically (at predetermined intervals, e.g., biweekly) updated to add/remove tables/columns (steps s305 and s310). Data tables T3-T6 are also periodically (at predetermined intervals, e.g., monthly) recalibrated and/or updated according to any changes to historical data (steps s310 and s315). In embodiments, the execution periods can be adjusted according to the underlying operations and immediacy associated with the data.

According to one example implementation, an operator (430 in FIG. 4) through a user interface (420 in FIG. 4) provides one or more definitions/identifications of data to be analyzed using the calibrated thresholds of process 300. Thus, as described before, process 300 can be executed periodically or on an ad hoc basis in accordance with an operator input or preprogrammed instructions to output a generated report comprising one or more alert indicators that is embodied in output data 322. Additionally, in embodiments, process 300 can comprise obtaining, from the operator (430 in FIG. 4) via the user interface (420 in FIG. 4), the identification of data (not shown), where system 200 determines a subset of stored data (205 from data source 201) and one or more calibrated thresholds (T5/T6), which can be stored in DQ data storage 220, for analysis. Thereafter, the determined subset of data and calibrated threshold(s) are retrieved to perform steps s320 and s325 of analyzing the retrieved subset of stored data using the calibrated threshold(s) and generating a report incorporating one or more alert indicators using the analyzed data according to the calibrated threshold(s), respectively. The report incorporating the one or more alert indicators can then be outputted to the operator (430 in FIG. 4) via the user interface (420 in FIG. 4). In one example implementation, an operator identifies a time period, at least a subset of data tables/records, one or more categories (for example, one or more data types), pass/fail result, and the like, for analysis and a subset of overall data (205 from data source 201) corresponding to the identification is analyzed according to calibrated thresholds (317) determined at step s315, which is retrieved from DQ data storage 220.

Advantageously, the automatic calibration of thresholds for analyzing continuous and regularly recorded data provides for significant reduction in manual overhead with automated validation of all the attributes in the data (e.g., tables). Furthermore, system 200 is modularized and provides a reusable framework for different data types. With the reduced need for SME intervention, strategic programming from analyzed data is accelerated and, thus, timelier.

Figure 4:
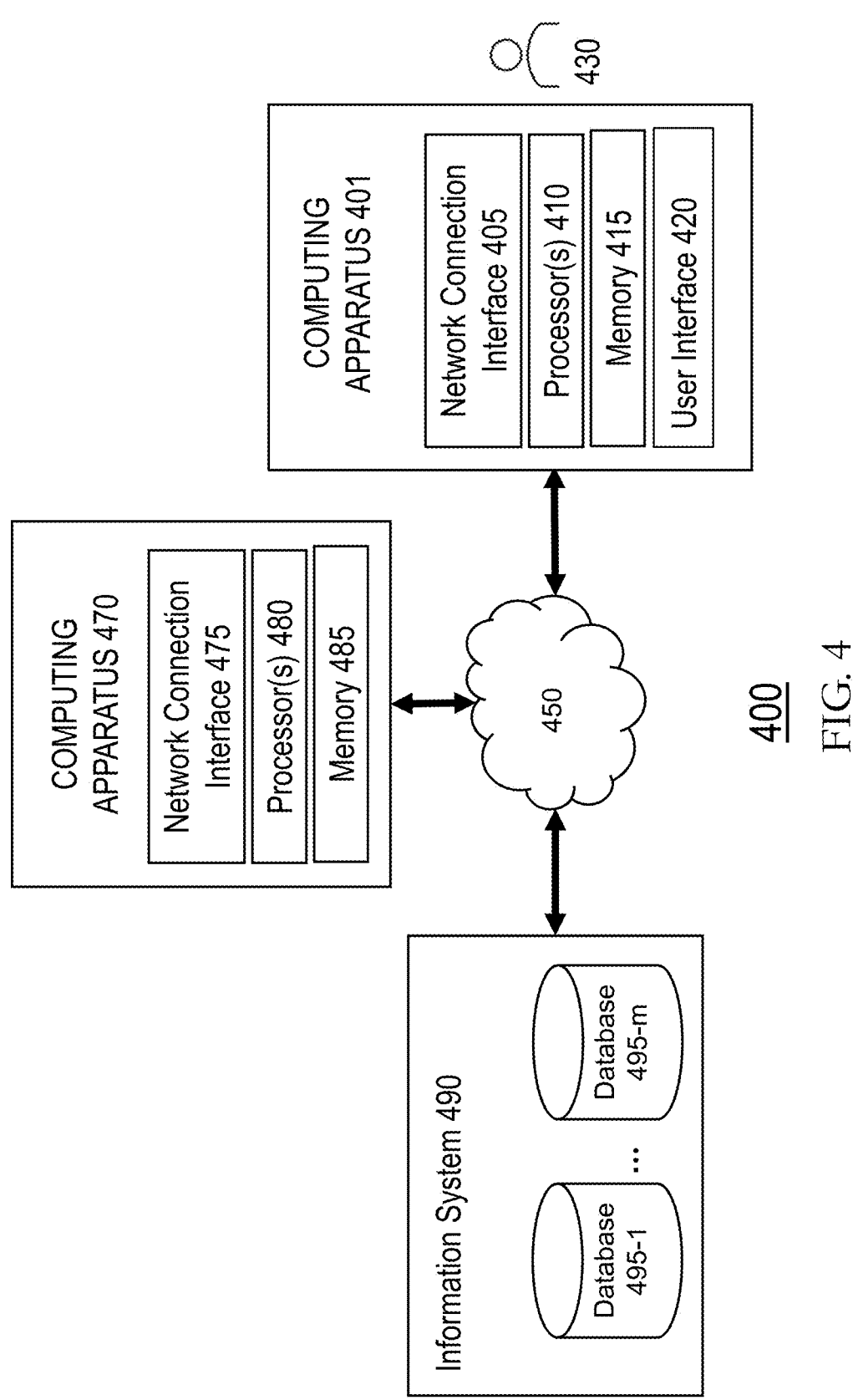
FIG. 4 is a schematic diagram illustrating a system for implementing the data validation system of FIG. 2 and for executing the DQ threshold calibration process of FIG. 3 according to example implementations of the present disclosure.

FIG. 4 is a schematic diagram illustrating a system 400 for implementing data validation system 200 and for executing DQ threshold calibration process 300 according to example implementations of the present disclosure.

In one example embodiment, system 400 comprises computing apparatus 401, which can be any computing device and/or data processing apparatus capable of embodying the systems and/or methods described herein and can include, for one or more corresponding users (430), any suitable type of electronic device including, but are not limited to, a workstation, a desktop computer, a mobile computer (e.g., laptop, ultrabook), a mobile phone, a portable computing device, such as a smart phone, tablet, personal display device, personal digital assistant ("PDA"), virtual reality device, wearable device (e.g., watch), to name a few, with network access that is uniquely identifiable by Internet Protocol (IP) addresses and Media Access Control (MAC) identifiers.

As illustrated in FIG. 4, computing apparatus 401 is comprised of a network connection interface 405 for communicatively connecting to a network 450, one or more processor(s) 410, a memory 415, and a user interface 420. According to one example implementation, computing apparatus 401 is communicatively connected to computing apparatus 470 and information system 490 via network 450, which collectively form a cloud computing system for executing system 200 and process 300.

Network connection interface 405 can use any suitable data communications protocols. According to an exemplary embodiment, network connection interface 405 comprises one or more universal serial bus ("USB") ports, one or more Ethernet or broadband ports, and/or any other type of hardwire access port to communicate with network 450 and, accordingly, computing apparatus 470 and information system 490. In some embodiments, computing apparatus 401 can include one or more antennas to facilitate wireless communications with a network using various wireless technologies (e.g., Wi-Fi, Bluetooth, radiofrequency, etc.).

One or more processor(s) 410 can include any suitable processing circuitry capable of controlling operations and functionality of computing apparatus 401, as well as facilitating communications between various components within computing apparatus 401. In some embodiments, processor(s) 410 can include a central processing unit ("CPU"), a graphic processing unit ("GPU"), one or more microprocessors, a digital signal processor, or any other type of processor, or any combination thereof. In some embodiments, the functionality of processor(s) 410 can be performed by one or more hardware logic components including, but not limited to, field-programmable gate arrays ("FPGA"), application specific integrated circuits ("ASICs"), application-specific standard products ("AS-SPs"), system-on-chip systems ("SOCs"), and/or complex programmable logic devices ("CPLDs"). Furthermore, each of processor(s) 410 can include its own local memory, which can store program systems, program data, and/or one or more operating systems. Thus, one or more components of data validation system 200, such as calibration task component 210 and reporting task component 215, as well as program interface 225, can be embodied by one or more program applications executed by processor(s) 410 and/or embodied in conjunction with instructions stored in memory 415. Likewise, DQ threshold calibration process 300 can be executed, at least in part, by processor(s) 410, instructions and data (including, e.g., data tables T1-T6) for which can be stored in any one or more of memory 415, memory 485, and information system 490.

Memory 415 can include one or more types of storage mediums, such as any volatile or non-volatile memory, or any removable or non-removable memory implemented in any suitable manner to store data for computing apparatus 401. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 415 can be implemented as computer-readable storage media ("CRSM"), which can be any available physical media accessible by processor(s) 410 to execute one or more instructions stored within memory 415. According to an exemplary embodiment, one or more applications and data for implementing data validation system 200 and for executing DQ threshold calibration process 300 described above are stored in memory 415 and executed by processor(s) 410.

User interface 420 is operatively connected to processor(s) 410 and can include one or more input or output device(s), such as switch(es), button(s), key(s), a touch screen, a display, mouse, microphone, camera(s), sensor(s), etc. as would be understood in the art of electronic computing devices. Thus, an operator, SME, or developer 430 can interact with computing apparatus 401 via user interface 420 to obtain one or more reported alerts generated by data validation system 200. According to one embodiment, operator 430 programs the periodic executions associated with system 200 and process 300 via user interface 420, which return corresponding results, including reported alerts, to operator 430 via user interface 420. Thus, program interface 225, shown in FIG. 2, can be incorporated in one or more program applications executed at computing apparatus 401 for obtaining final reporting data and displaying said data to operator 430 via user interface 420. Correspondingly, the results can be stored in memory 415 and/or communicated via network connection interface 405 through network 450—for example, to computing apparatus 470 or information system 490. In embodiments, data source 201 and DQ data storage 220, shown in FIG. 2, can be implemented at least in part using one or more of memory 415, computing apparatus 470, and information system 490.

Communications systems for facilitating network 450 include hardware (e.g., hardware for wired and/or wireless connections) and software. Wired connections can use coaxial cable, fiber, copper wire (such as twisted pair copper wire), and/or combinations thereof, to name a few. Wired connections can be provided through Ethernet ports, USB ports, and/or other data ports to name a few. Wireless connections can include Bluetooth, Bluetooth Low Energy, Wi-Fi, radio, satellite, infrared connections, ZigBee communication protocols, to name a few. In embodiments, cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, LTE, 5G, and/or 6G to name a few) can be included.

Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Accordingly, network 450 can be accessed, for example, using Transfer Control Protocol and Internet Protocol ("TCP/IP") (e.g., any of the protocols used in each of the TCP/IP layers) and suitable application layer protocols for facilitating communications and data exchanges among servers, such as computing apparatus 470 and information system 490, and clients, such as computing apparatus 401, while conforming to the above-described connections and protocols as understood by those of ordinary skill in the art.

In an exemplary embodiment, computing apparatus 470 serves an application server to computing apparatus 401 for hosting one or more applications—for example, those associated with the implementation of the above—described data validation system 200 and for executing DQ threshold calibration process 300 that are accessible and executable over network 450 by authorized users (e.g., 430) at computing apparatus 401. In accordance with an exemplary embodiment, computing apparatus 470 includes network connection interface 475, processor(s) 480, and memory 485. Network connection interface 475 can use any of the previously mentioned exemplary communications protocols for communicatively connecting to network 450. Exemplary implements of network connection interface 475 can include those described above with respect to network connection interface 405, which will not be repeated here. One or more processor(s) 480 can include any suitable processing circuitry capable of controlling operations and functionality of computing apparatus 470, as well as facilitating communications between various components within computing apparatus 470. Exemplary implements of processor(s) 480 can include those described above with respect to processor(s) 410, which will not be repeated here. Memory 485 can include one or more types of storage mediums, such as any volatile or non-volatile memory, or any removable or non-removable memory implemented in any suitable manner to store data for computing apparatus 470, exemplary implements of which can include those described above with respect to memory 415 and will be not repeated here. In embodiments, executable portions of applications maintained at computing apparatus 470 can be offloaded to computing apparatus 401. For example, user interface renderings and the like can be locally executed at computing apparatus 401.

Information system 490 incorporates databases 495-1 . . . 495-m that embodies servers and corresponding storage media for storing data associated with, for example, the implementation of the above-described data validation system 200 and for executing DQ threshold calibration process 300 which can be accessed over network 450 as will be understood by one of ordinary skill in the art. Exemplary storage media for the database(s) 495 correspond to those described above with respect to memory 415, which will not be repeated here. According to an exemplary embodiment, information system 490 incorporates databases 495-1 . . . 495-m and can incorporate any suitable database management system. Information system 490 incorporates a network connection interface (not shown) for communications with network 450 and exemplary implements of which can include those described above with respect to network connection interface 405, which will not be repeated here. Thus, data and code associated with the above-described data validation system 200 and for executing DQ threshold calibration process 300 can be maintained and updated at information system 490 via network access at computing apparatus 401 by operator 430. The processes can be executed at any one or more of computing apparatus 401, computing apparatus 470, and information system 490. According to one example implementation, data source 201 and DQ data storage 220, shown in FIG. 2, are maintained at information system 490.

EXAMPLES

Example 1

For a financial brokerage or the like, transaction volatility is an important metric that requires continuous monitoring. With high volumes of daily transactions, manually defined thresholds do not accurately track fluid conditions related to the transactions and can result in large numbers of false failures being detected based on such thresholds. In other words, such thresholds can frequently become stale and would require continuous updates.

Table 1 below contains a series of data points on Total AUM (asset under management) for an example organization taken on a weekly basis. Each AUM result being a data point X of Equation (1) described above.

TABLE 1

| Date | Total AUM(X) |
|---|---|
| Mar. 27, 2022 | 42,211,991 |
| Apr. 3, 2022 | 43,956,211 |
| Apr. 10, 2022 | 43,522,286 |
| Apr. 17, 2022 | 47,861,893 |
| Apr. 24, 2022 | 47,727,178 |
| May 1, 2022 | 45,033,015 |
| May 8, 2022 | 41,774,881 |
| May 15, 2022 | 46,948,222 |
| May 22, 2022 | 43,362,247 |
| May 29, 2022 | 42,368,933 |
| Jun. 5, 2022 | 49,305,479 |
| Jun. 12, 2022 | 44,374,891 |
| Jun. 19, 2022 | 40,266,791 |
| Jun. 26, 2022 | 43,286,572 |
| Jul. 3, 2022 | 46,116,391 |

Table 2 below is a sample portion of data table T4 containing the D, according to Equation (1) for the Total AUM(X) of Table 1, where t=7/03/22.

TABLE 2

| $D_{t-8}$ | $D_{t-7}$ | $D_{t-6}$ | $D_{t-5}$ | $D_{t-4}$ | $D_{t-3}$ | $D_{t-2}$ | $D_{t-1}$ | $D_t$ |
|---|---|---|---|---|---|---|---|---|
| 7.27 | 5.30 | 3.38 | 5.90 | 10.00 | 2.57 | 10.74 | 2.02 | 4.90 |

Based on the data in Table 2 above, Table 3 contains the $Q3(D_{t-8 \ to \ t-1})$ and IQR terms for Equation (2).

TABLE 3

| | |
|---|---|
| $Q3(D_{t-8 \ to \ t-1})$ | 8.64 |
| IQR | 5.66 |

Accordingly, the appropriate threshold for analyzing AUM over the period preceding t=7/03/22, according to Equation (2) is $T_t$=8.64+1.5*5.66=17.13.

Example 2

Table 4 below contains four sample data categories of the continuous data type and corresponding predetermined SME thresholds and periodic relevant results—for example, for t=7/3/22 and for t+1=7/10/22—using the aforementioned original technique for identifying and reporting potential failures when a data point exceeds an upper limit threshold or is below a lower limit threshold.

TABLE 4

| Variable | Predetermined Threshold | Result$_{Jul.3,2022}$ | Result$_{Jul.10, 2022}$ |
|---|---|---|---|
| AUM_BANK_AMT | 3 | 14 | 13 |
| BND_HLDG_AMT | 5 | 7 | 8 |
| POS_BND_QTY | 3 | 7 | 7 |
| AUM_TOT_AMT | 10 | 2 | 0 |

AUM_BANK_AMT represents an AUM of a particular bank with an upper limit threshold, BND_HLDG_AMT represents a security (bond) holding amount with an upper limit threshold, POS_BND_QTY represents a security (bond) position quantity with an upper limit threshold, and AUM_TOT_AMT represents an overall AUM amount with an upper limit threshold. As shown in Table 4 above, three (3) of the four (4) variables showed failures for exceeding their respective predetermined thresholds set by a SME using the original technique-AUM_BANK_AMT, BND_HLDG_AMT, POS_BND_QTY, and AUM_TO-T_AMT.

Table 5 below is an example data table T6 containing pass/fail results (RESULT_PASS_FLG) for the four sample data categories of Table 4 using respective $T_{7/3/22}$ thresholds for respective parameters for each of the data categories according to one example implementation of the present disclosure. As shown in Table 5 below, the respective results in the rows below the respective rows of the thresholds all do not exceed the respective thresholds $T_{7/73/22}$. Thus, the results of Table 5 reflect the prevention of false failure determinations using the original technique for three (3) of the sample data categories.

score, which is based on a number of overall detected failures, as well as a trend graph 510 showing periodically recorded health scores. Additionally, a "Table Level Health" portion 515 (FIG. 5B) shows respective bar representations of passes/failures detected for respective data tables, a "Columns-DQ Status" portion 520 shows an overall column pass/fail count, and a "Columns DQ Trend" portion 525 shows a trend graph for periodically recorded failures shown in portion 520. Additionally, GUI 500a/500b includes an input portion 530 (FIG. 5A) that receives inputs for defining a refresh date (t) and a particular table, a subset of tables, or a full set ("ALL") of tables for the displayed information, as well as control a view mode of GUI 500a/500b.

Figures 6B, 6C:
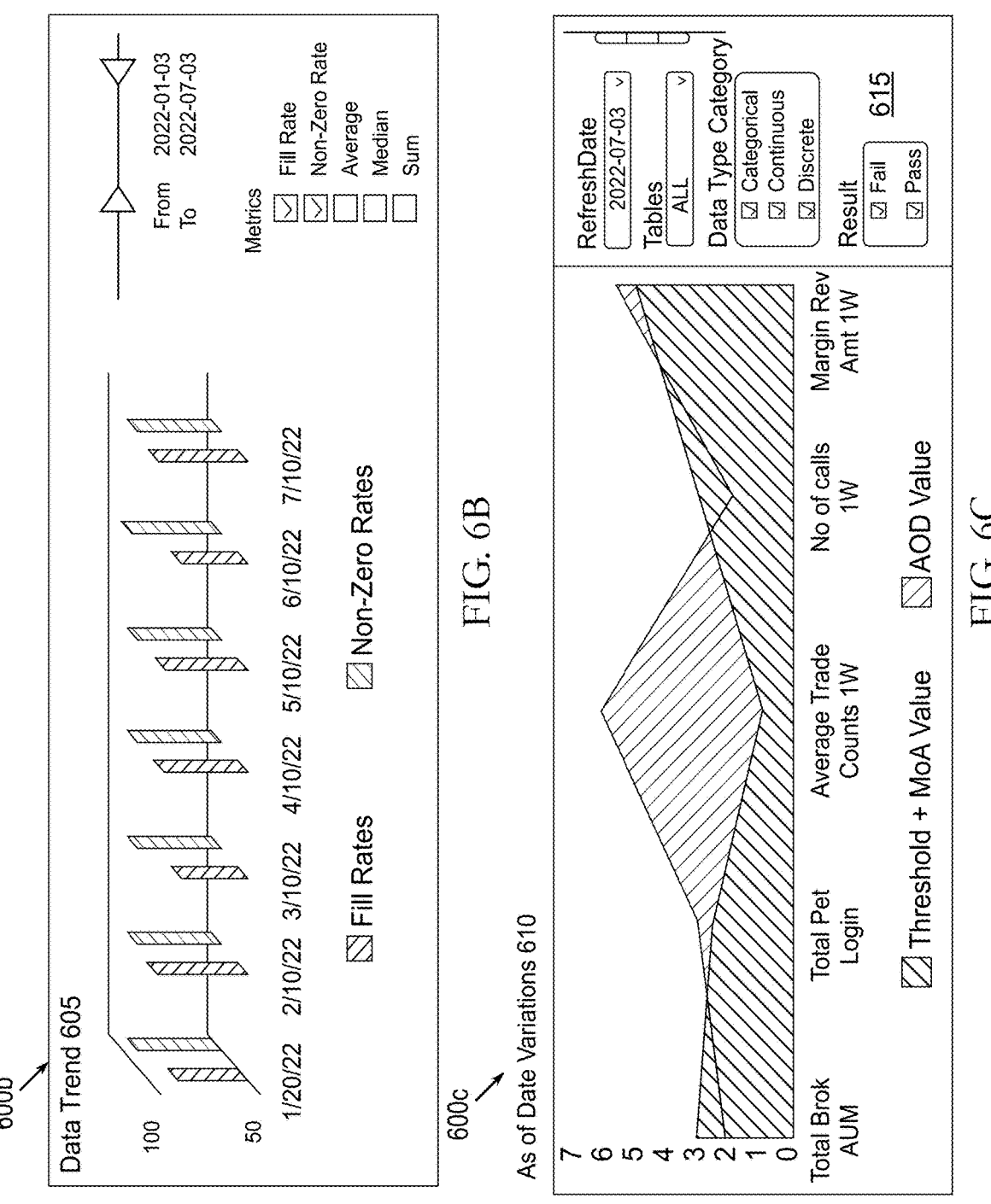

FIGS. 6A, 6B, and 6C form an illustration of a graphical user interface (GUI) 600a/600b/600c for presenting specific DQ information from table T6 and output reporting data of system 200. As illustrated in FIGS. 6A, 6B, and 6C, GUI 600a/600b/600c includes: a "DQ Report" portion 601 (FIG. 6A) that shows a report corresponding to Table 5 for a selected data table, a "Data Trend" portion 605 (FIG. 6B) that shows a trend graph of respective DQ parameters (with a selectable date range and selectable parameters: fill rate, non-zero rate, average, median, sum), and a "As of Date Variations" portion 610 (FIG. 6C) that shows variations in different data categories for a selected date—with an input portion 615 that receives inputs for defining a refresh date (t), defining a particular table, a subset of tables, or a full set ("ALL") of tables, data type categories (categorical, continuous, and/or discrete), results (pass and/or fail) for the displayed information in portion 610.

FIG. 7 is an illustration of a graphical user interface (GUI) 700 for presenting a "DQ Tabular Report" 701 from table T6 and output reporting data of system 200. As illustrated in FIG. 7, the "DQ Tabular Report" portion 701 of GUI 700 shows a detailed report with results for different data types, including those corresponding to Table 5, for a selected one or more data table. As with GUIs 500 and 600, GUI 700 includes an input portion 705 that receives inputs for defining a refresh date (t), defining a particular table, a subset of tables, or a full set ("ALL") of tables, data type categories (categorical, continuous, and/or discrete), results (pass and/or fail) for the displayed information in portion 701.

TABLE 5

| COLUMN_NM | AUM_TOTAL_AMT | POS_BND_QTY | BND_HLDG_AMT | AUM_BANK_AMT |
|---|---|---|---|---|
| REFRESH_DT | Jul. 3, 2022 | Jul. 3, 2022 | Jul. 3, 2022 | Jul. 3, 2022 |
| RESULT_PASS_FLG | TRUE | TRUE | TRUE | TRUE |
| THRESHOLD_FILL_PCT | 0 | 0 | 0 | 0 |
| FILL_ASOF_DATE_PCT | 0 | 0 | 0 | 0 |
| THRESHOLD_CNTNS_NON_ZERO_PCT | 0.429 | 5.532 | 5.532 | 0.933 |
| CNTNS_NON_ZERO_ASOF_DATE_PCT | 0.363 | 1.45 | 1.45 | 0.69 |
| THRESHOLD_CNTNS_SUM_PCT | 8.867 | 13.635 | 13.804 | 5.34 |
| CNTNS_SUM_ASOF_DATE_PCT | 0.338 | 0.008 | 0.785 | 0.382 |
| THRESHOLD_CNTNS_AVG_PCT | 9.976 | 13.066 | 13.243 | 5.825 |
| CNTNS_AVG_ASOF_DATE_PCT | 1.132 | 0.806 | 1.602 | 1.193 |
| THRESHOLD_CNTNS_MEDIAN_PCT | 16.123 | 0 | 0 | 0 |
| CNTNS_MEDIAN_ASOF_DATE_PCT | 7.392 | 0 | 0 | 0 |

Example 3

Figure 5A:
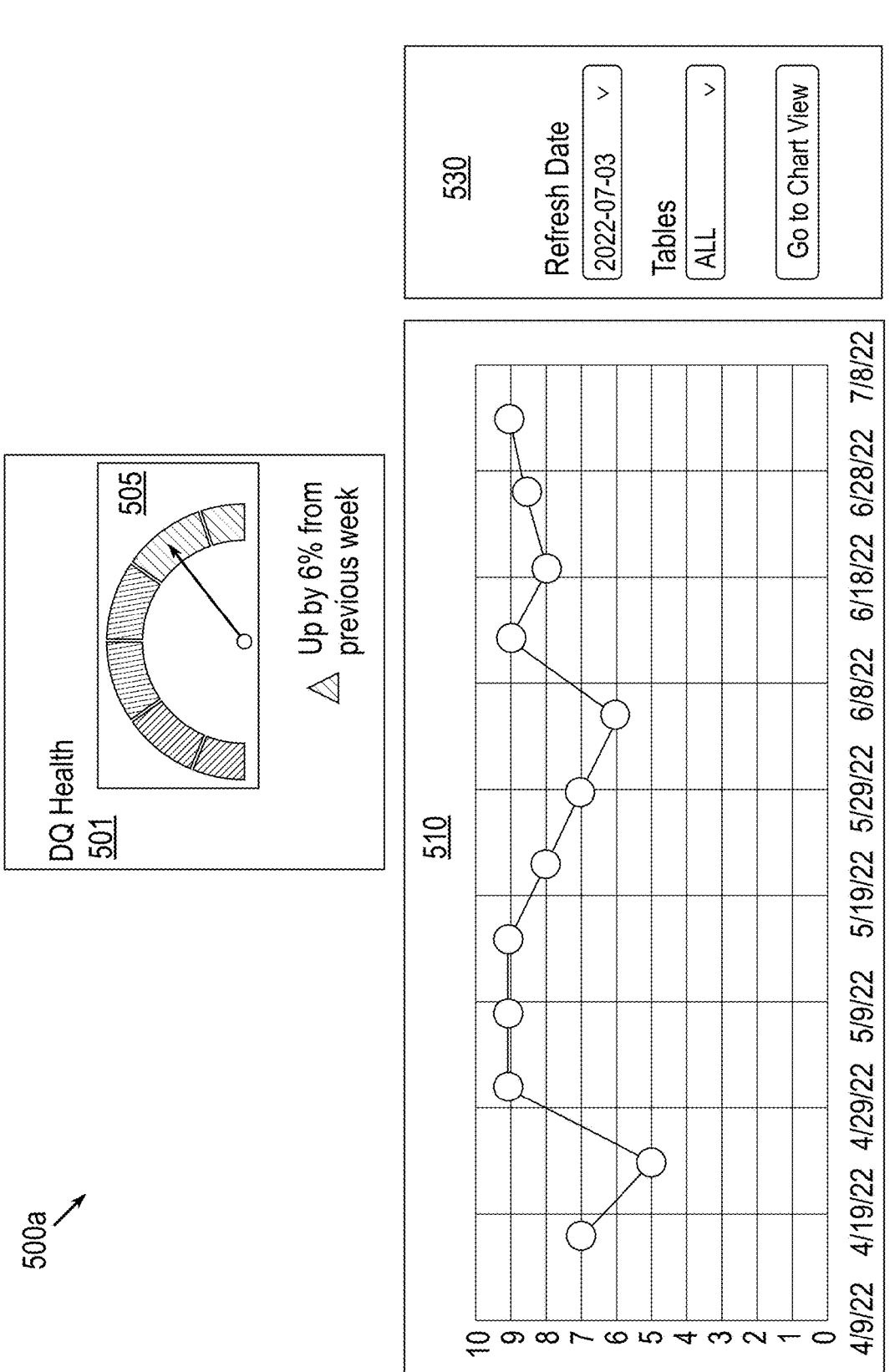
FIGS. 5A and 5B form an illustration of a graphical user interface (GUI) for presenting an overall DQ health of processed data according to an example implementation of the present disclosure.
Figure 5B:
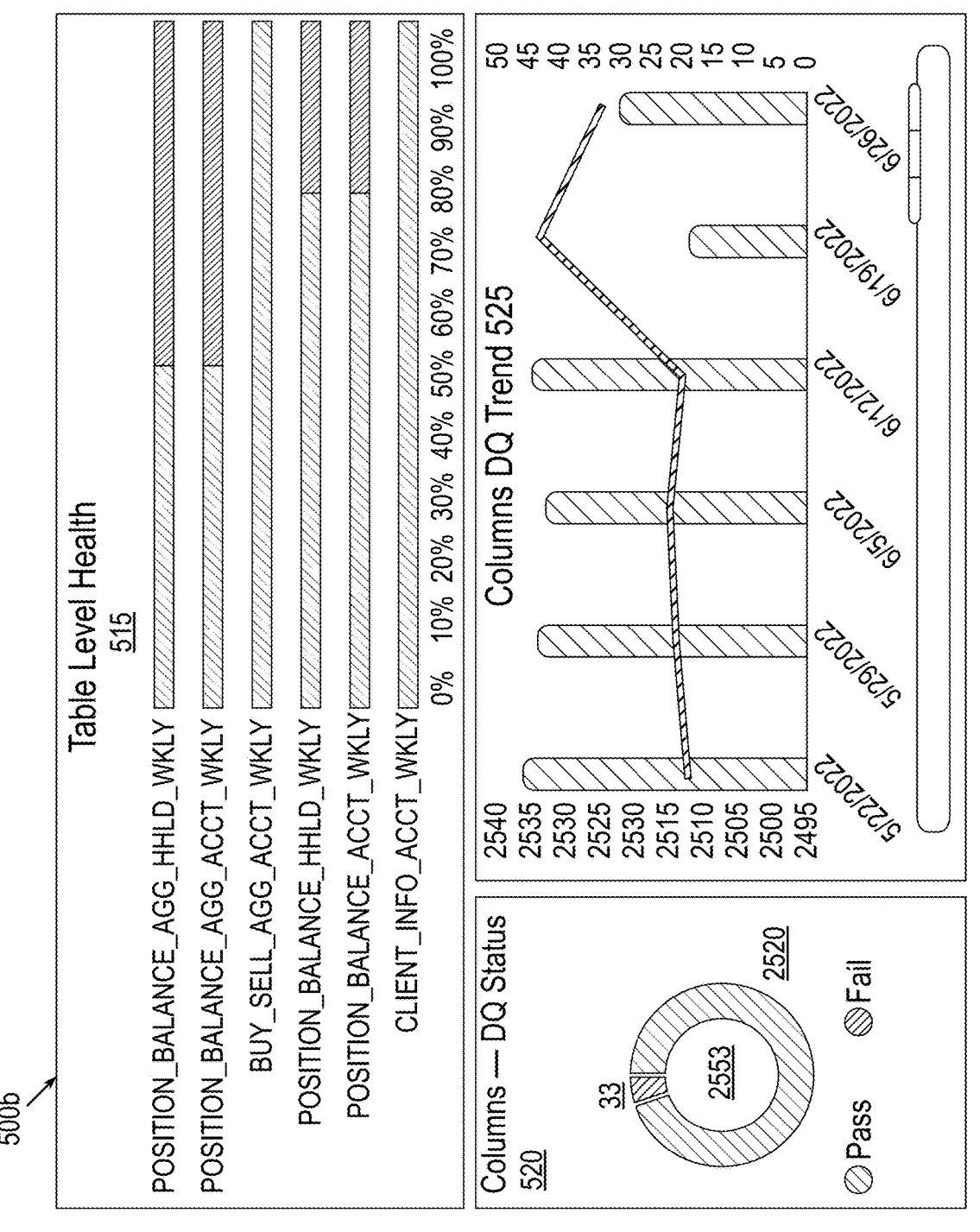

FIGS. 5A and 5B an illustration of a graphical user interface (GUI) 500a/500b for presenting a DQ heath summary dashboard on t=7/3/2022 based on respective thresholds $T_t$ from table T6 and output reporting data of system 200. As illustrated in FIGS. 5A and 5B, GUI 500a/500b includes an overall "DQ Health" display portion 501 (FIG. 5A) that includes a dial 505 for indicating a current health Additional Implementations One or more additional example implementations of the present disclosure are described in the following.

Figure 8:
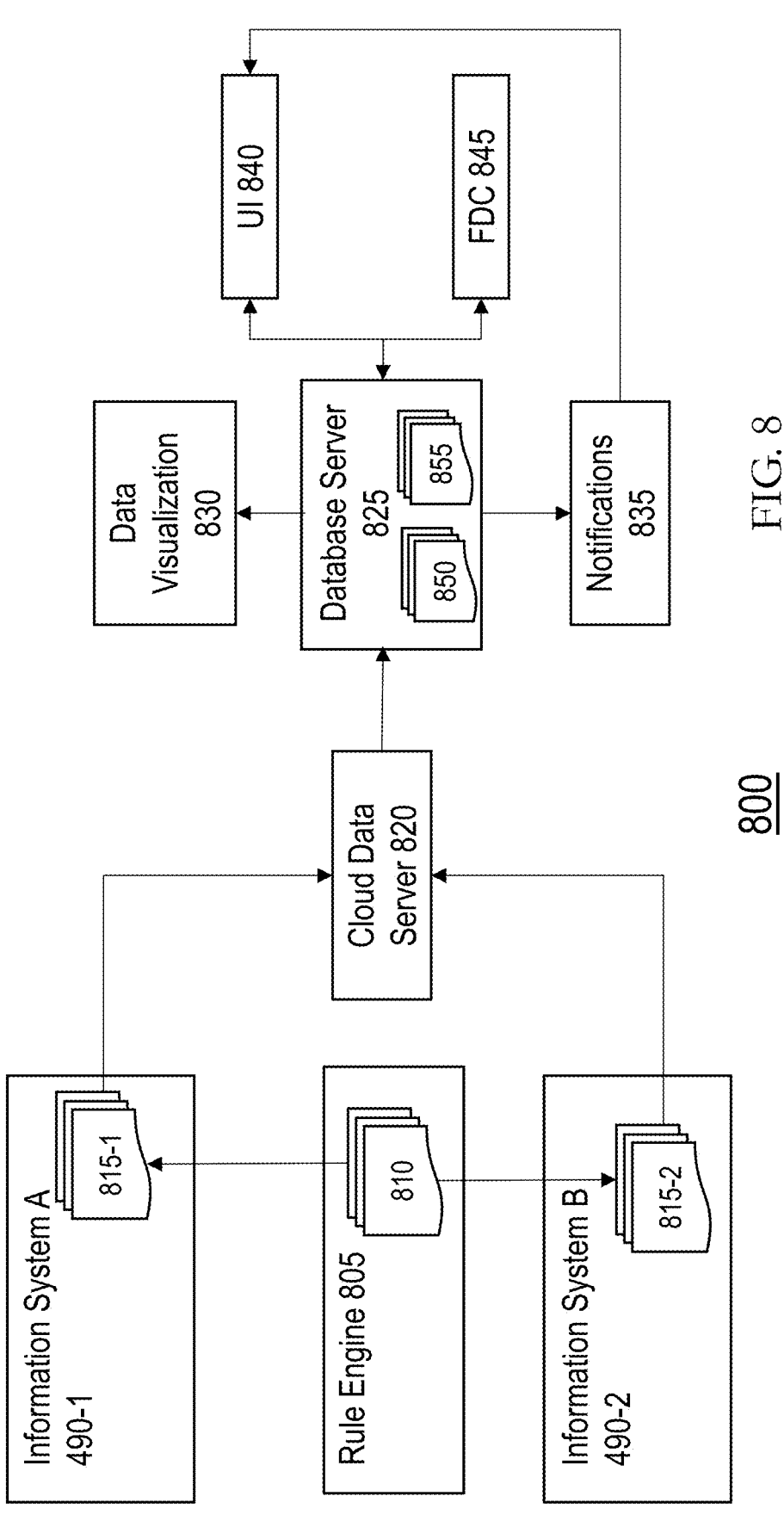
FIG. 8 is a schematic diagram illustrating a data quality validation system according to one or more example implementations of the present disclosure.

FIG. 8 is a schematic diagram illustrating a data quality validation system 800 according to one or more example implementations of the present disclosure.

As illustrated in FIG. 8, data quality validation system 800 incorporates two discrete information systems 490 information system A 490-1 and information system B 490-2. In certain embodiments, system 800 can incorporate any number n of information systems 490-*n* (n≥1). Information system(s) 490 can conform to a framework including, without limitation, Snowflake, Apache Hadoop, or the like.

For accommodating multiple information systems 490 with the same or different frameworks, system 800 incorporates a rules engine 805 that dynamically generates rule sets 810 corresponding to respective sets of data retrieved from information systems 490. As illustrated in FIG. 8, rules engine 805 provides rule sets 810 to information system A 490-1 and information system B 490-2 in correspondence with sets of data that are served to cloud data server 820. In one or more exemplary implementations, data requests are received from one or more users, for example, using computing apparatus 401 illustrated in FIG. 4 via user interface (UI) 840, and one or more sets of data corresponding to the data requests are transmitted from information system A 490-1 and/or information system B 490-2 to cloud data server 820 in the form of one or more output data files 815-1 and/or 815-2. The output data files 815 incorporate one or more data tables that contain one or more columns of data. In certain embodiments, a column of data can incorporate a time series of data points—for example, AUM over a predetermined period, or the like. Rule sets 810 corresponding to the output data files 815-1 and/or 815-2 are predetermined according to data quality parameters and characteristics associated with each set (or column) of data.

Table 6 below incorporates a non-exhaustive list of example data types included in output data files 815, their respective categories, and corresponding representative rules that are applicable to the respective data types.

TABLE 6

| Data Type | Category | Rule Description |
|---|---|---|
| DATE | VALIDITY | Blank\Zero Value Percentage |
| DATE | VALIDITY | Future Date Percentage |
| DATE | VALIDITY | Invalid Date Percentage |
| DATE | VALIDITY | Null Value Percentage |
| NA | TIMELINESS | Job Completion Time |
| NA | TIMELINESS | Table Staleness Check |
| NA | VALIDITY | Record Count |
| NUMBER | CATEGORICAL | NA |
| NUMBER | CONTINUOUS | Average of Values |
| NUMBER | CONTINUOUS | Maximum of Values |
| NUMBER | CONTINUOUS | Median of Values |
| NUMBER | CONTINUOUS | Minimum of Values |
| NUMBER | CONTINUOUS | Sum of Values |
| NUMBER | DISCRETE | Number of Unique Values |
| NUMBER | DISCRETE | Unique Value Percentage |
| NUMBER | VALIDITY | Blank\Zero Value Percentage |
| NUMBER | VALIDITY | Negative Value Percentage |
| NUMBER | VALIDITY | Null Value Percentage |
| STRING | DISCRETE | Number of Unique Values |
| STRING | DISCRETE | Unique Value Percentage |
| STRING | VALIDITY | Blank\Zero Value Percentage |
| STRING | VALIDITY | Null Value Percentage |
| TIMESTAMP | VALIDITY | Blank\Zero Value Percentage |
| TIMESTAMP | VALIDITY | Future Timestamp Percentage |
| TIMESTAMP | VALIDITY | Invalid Timestamp Percentage |
| TIMESTAMP | VALIDITY | Null Value Percentage |
| UNK | NA | Data Consistency Check |

Corresponding to the data types, rule sets 810 include anomaly detection settings. The anomaly detection settings for one or more of the representative rules listed in Table 6 can include, without limitation:

a. Upward anomaly detection: enabled/disabled
b. Upward anomaly sensitivity: low, medium, high
c. Downward anomaly detection: enabled/disabled d. Downward anomaly sensitivity: low, medium, high
e. Day over day absolute change % buffer In certain embodiments, anomaly detection can be enabled in some or all data categories for:
a. Fail if Zero Records Detected: Enabled/Disabled In one or more exemplary implementations, the anomaly detection settings are set in one or more profiles corresponding to output data files 815 in rule sets 810. In certain embodiments, the anomaly detection and/or sensitivity can be adjusted based on DQ anomaly detections and confirmations using one or more of a statistical and ML model. Correspondingly, rule sets 810 incorporate one or more data tables that include the following information shown in Table 7 below.

TABLE 7

| Label | Description |
|---|---|
| Data Type Rule | List of all generic DQ rules based on data types and/or categories |
| User Notification | List of all notifications transmitted to user(s) |
| Profile | List of all characteristic profiles and/or data tables |
| Column | List of all characteristic columns to be profiled |
| Profile Column | List of profiles and associated column list(s) |
| Profile Column Rule | List of profiles and associated columns/rules/workstreams |
| Rule | List of characteristic data quality rules |
| Profile Result | Scores and break counts for DQ rules |
| Notification | Finalized DQ notification |

The output data files 815 received at cloud data server 820 are relayed to database server 825 to facilitate one or more of a data visualization application 830, notifications 835, a UI 840, and a fault detection and classification (FDC) application 845. In one or more exemplary implementations, the output data files 815 are transmitted to one or more users (or user accounts) that are maintained at system 800 via database server 825 and cloud data server 820 in response to one or more data requests from the one or more users. In certain implementations, the data requests can be generated autonomously based on one or more subscriptions by the one or more users to one or more data tables that are created and maintained by the same or different user(s) at system 800. In embodiments, cloud data server 820 and database server 825 can be embodied by one or more computing apparatuses 470 (or 401) shown in FIG. 4 and described above. Database server 825 can conform to a known database protocol, such as SQL or the like. Data visualization application 830 and notifications 835 can include functionality executed at one or more computing apparatuses, e.g., 401 and/or 470 illustrated in FIG. 4. For example, features of data visualization application 830 and notifications 835 can be incorporated in one or more applications executed at a user computing apparatus, such as computing apparatus 401, and/or a network-accessed application server, which can be embodied by one or more computing apparatuses 470. Correspondingly, UI 840 and FDC 845 can likewise be executed a user computing apparatus, such as computing apparatus 401, and/or a network-accessed application server, which can be embodied by one or more computing apparatuses 470.

In one or more exemplary implementations, database server 825 maintains at least a designated target source data table 850 for maintaining ongoing updates to stored data as well as a target source batch data table 855 for managing data ingestion (or updates) and data quality validation. Correspondingly, data quality system 800 periodically executes batch stability processes in connection with data tables 850 and 855 for validating data quality of continually updated (or ingested) data.

Figure 9:
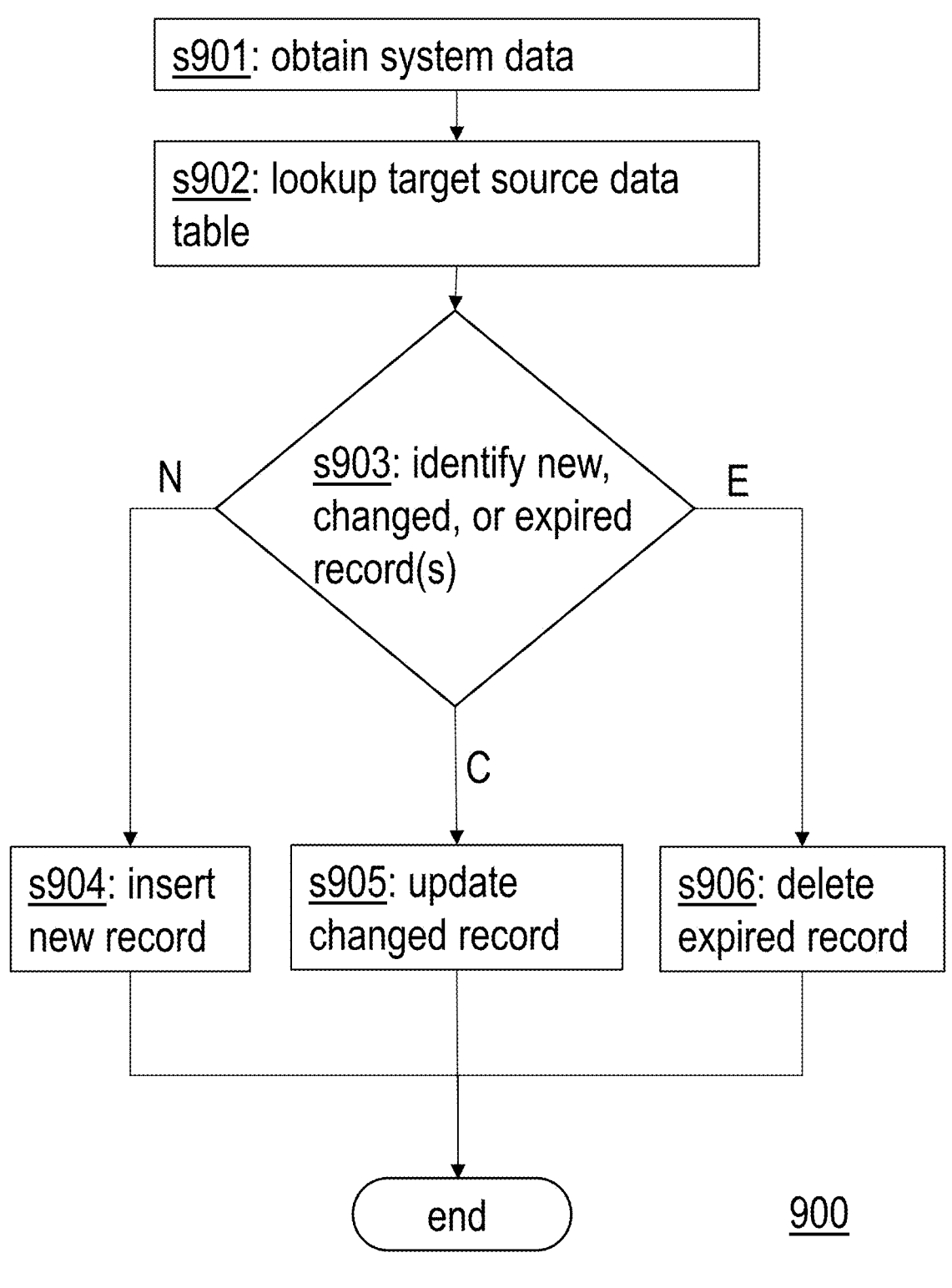
FIG. 9 is a flow diagram illustrating a periodic data ingestion (or updating) process for the data quality validation system of FIG. 8 according to one or more exemplary implementations of the present disclosure.

FIG. 9 is a flow diagram illustrating a periodic data ingestion (or updating) process 900 for data quality valida- tion system 800 according to one or more exemplary imple- mentations of the present disclosure.

As illustrated in FIG. 9, data ingestion process 900 initiates with step s901 at which cloud data server 820 obtains system (or systemwide) data. In one or more exem- plary implementations, the system (or systemwide) data can comprise the most up-to-date (or up-to-the-minute) data maintained at an EDW, a data lake, or the like, at database server 825. Next, at step s902, cloud data server 820 retrieves (e.g., conducts a lookup on) a target source data (or system database) table 850 at database server 825. In one or more exemplary embodiments, data ingestion process 900 is conducted periodically (at a time interval), for example, daily. Accordingly, the target source data table 850 at database server 825 is a designated "daily" target source data table 850.

Next, at step s903, cloud data server 820 identifies records in the obtained system (or systemwide) data that are new, that have been changed, or that have expired. For identified new records ("N"), at step s904, cloud data server 820 inserts the identified new records to update target source data table 850 at database server 825. The updated target source data table 850 is designated as a data quality management system data table. For records that are identified to have changed ("C"), at step s905, cloud data server 820 updates the changed records at the updated data quality management system target source data table 850 at database server 825. For records that have expired ("E"), at step s906, cloud data server 820 deletes the expired records from the updated data quality management system target source data table 850 at database server 825. In one or more exemplary implemen- tations, the periodic (or daily) data ingestion process 900 can comprise one or more extract, transform, load (ETL) pro- cesses.

Figure 10:
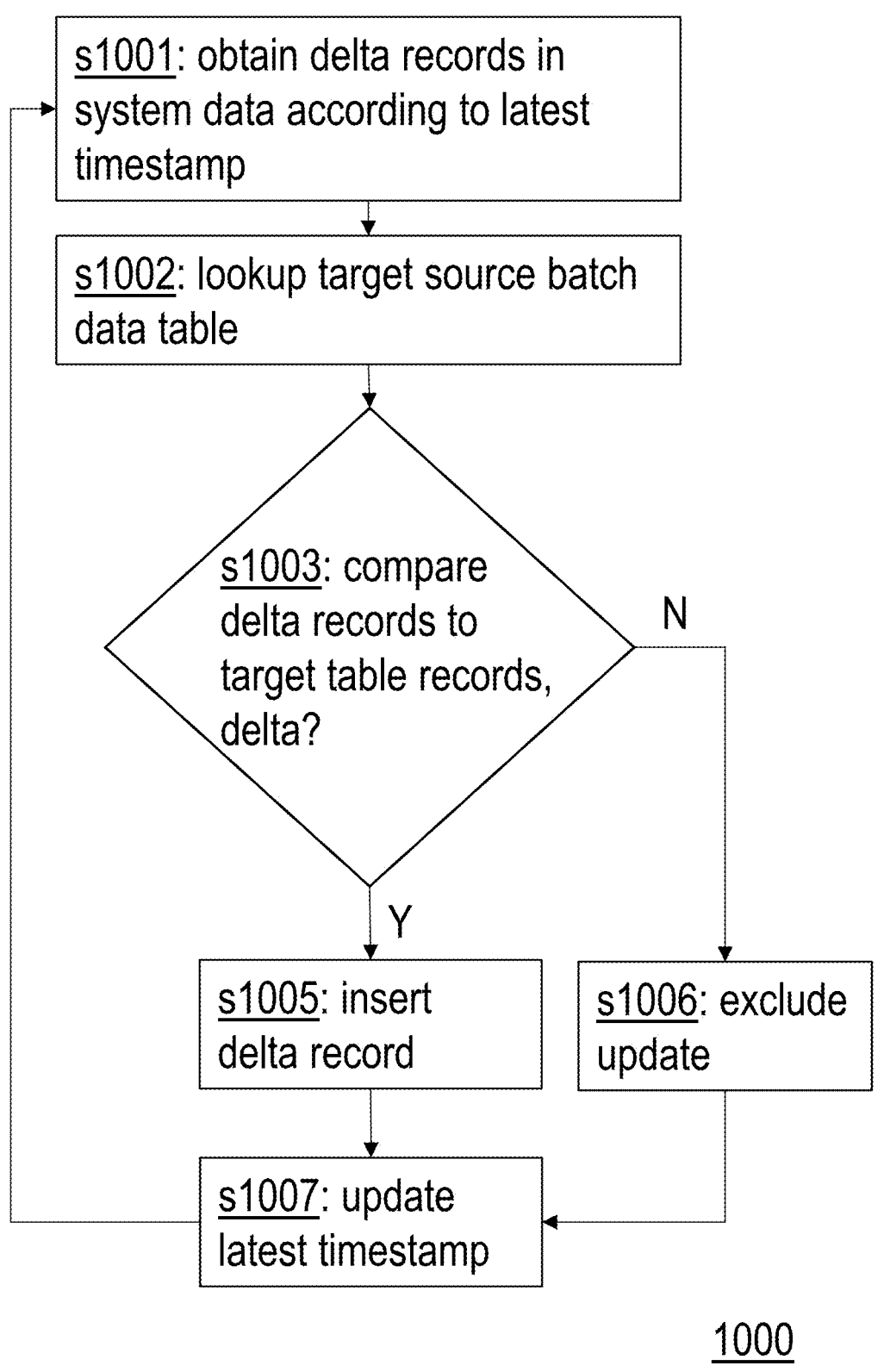
FIG. 10 is a flow diagram illustrating another periodic data ingestion (or updating) process for the data quality validation system of FIG. 8 according to one or more exemplary implementations of the present disclosure.

FIG. 10 is a flow diagram illustrating another periodic data ingestion (or updating) process 1000 for data quality validation system 800 according to one or more exemplary implementations of the present disclosure. In one or more exemplary implementations, process 1000 is executed on an hourly basis in conjunction with daily process 900.

As illustrated in FIG. 10, data ingestion process 1000 initiates with step s1001 at which cloud data server 820 obtains system (or systemwide) data. In one or more exem- plary implementations, the system (or systemwide) data can comprise the most up-to-date (or up-to-the-minute) data maintained at an enterprise data warehouse (EDW), a data lake, or the like, at database server 825. Additionally, cloud data server 820 identifies one or more delta records in the obtained system (or systemwide) data according to a latest timestamp. Next, at step s1002, cloud data server 820 retrieves (e.g., conducts a lookup on) a target source batch data table 855 at database server 825. In one or more exemplary embodiments, data ingestion process 1000 is conducted periodically (at a time interval), for example, hourly. Accordingly, the target source batch data table 855 at database server 825 is a designated hourly (or batch) target source batch data table 855, which can be comprised in target source data table 850. In one or more exemplary implementations, batch target source batch data table 855 forms a subset of target source data table 850 for periodic batch updates to table 855 between updates to table 850.

Next, at step s1003, cloud data server 820 compares the identified delta records in the system (or systemwide) data to the records of the target source batch data table 855. When there is a difference (or "delta") between one or more identified delta records and the target source batch data table 855 ("Y"), process 1000 proceeds to step s1005, where cloud data server 820 inserts the delta record(s) to the target source batch data table 855 at database server 825. If, however, the one or more identified delta records are not found to correspond to the target source batch data table 855 ("N"), then cloud data server 820, at step s1006, excludes the delta record(s) from any updates to the target source batch data table 855 at database server 825. Next, at step s1007, cloud data server 820 updates the latest timestamp for a next iteration of process 1000. In one or more exemplary implementations, the periodic (or hourly) data ingestion process 1000 can comprise one or more extract, transform, load (ETL) processes. In certain embodiments, processes 900 and 1000 can be executed at different periodic intervals, other than daily and hourly intervals, in an iterative or recursive manner. For example, each iteration of process 1000 can be executed based on a latest timestamp from a previous iteration.

Figure 11:
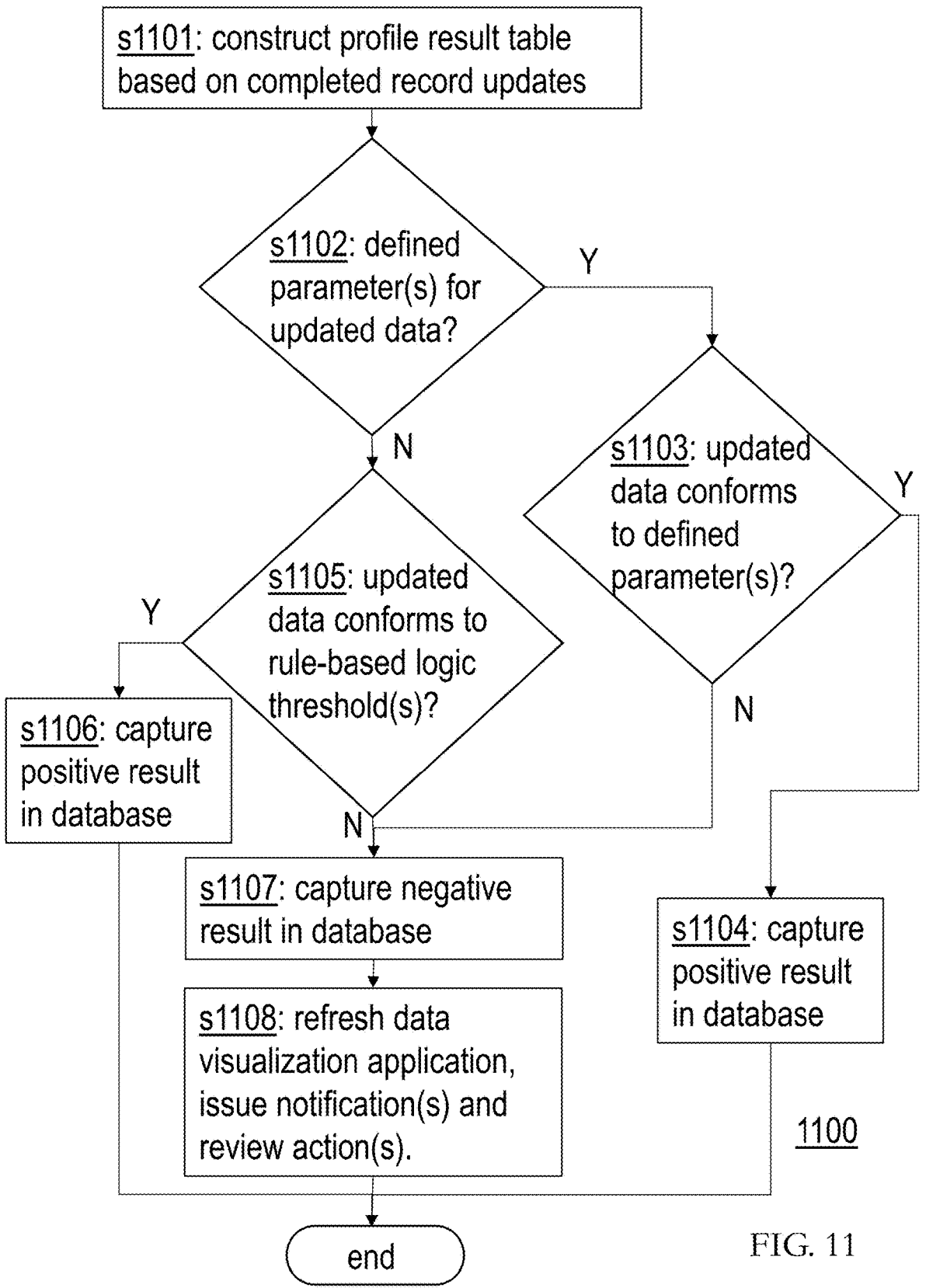
FIG. 11 is a flow diagram illustrating an update completion timeliness verification process for the data quality validation system of FIG. 8 according to one or more exemplary implementations of the present disclosure.

FIG. 11 is a flow diagram illustrating an update comple- tion timeliness verification process 1100 for data quality validation system 800 according to one or more exemplary implementations of the present disclosure. In one or more exemplary implementations, process 1100 is executed upon completion of one or more iterations of process 1000 to ensure data quality and timeliness of process 1000.

As shown in FIG. 11, process 1100 initiates with step s1101, where database server 825 retrieves completed record updates (e.g., updates to target source batch data table 855) from a latest iteration of process 1000 and constructs a profile result table (see, e.g., Table 7) comprising the latest updated data. Next, at step s1102, database server 825 determines whether there are predetermined (or pre-defined) parameters associated with the updated data that are stored and/or managed at database server 825. In one or more exemplary implementations, the parameters are defined in one or more service level agreements (SLAs) associated with the data provided at information system(s) 490, cloud data server 820, and/or database server 825 to users at, for example, computing apparatus 401 via data visualization application 830 and/or UI 840. In certain embodiments, the SLA(s) can incorporate one or more of the representative rules according to respective data types and/or categories shown in Table 6 and/or at least a subset of rule sets 810 incorporating the information shown in Table 7. Database server 825 can query one or more of information system(s) 490, cloud data server 820, and/or one or more computing apparatuses 401 and 470 to determine whether SLA param- eters have been defined for the updated data.

If database server 825 determines that there are one or more pre-defined parameters for the updated data ("Y"), process 1100 proceeds to step s1103, where database server 825 determines whether the updated data conforms to the pre-defined parameters (e.g., SLA parameters).

At step s1103, if database server 825 determines that the updated data conforms to the pre-defined parameters ("Y"), process 1100 concludes with step s1104, where database server 825 captures (or records) the positive result (no "anomaly") for the updated data in one or more of the profile result table (see, e.g., Table 7) and the target source batch data table 855. In certain embodiments, the positive result can be captured in one or more other databases.

Returning to step s1102, if database server 825 determines that there are no pre-defined parameters for the updated data ("N"), then process 1100 proceeds to step s1105, where database server 825 determines whether the updated data conforms to one or more rule-based logic thresholds. In certain embodiments, the one or more rule-based logic thresholds can comprise one or more z-score logic thresholds or the like.

At steps s1105, if database server 825 determines that the updated data conforms to the rule-based logic threshold(s), then process 1100 concludes with step s1106, where database server 825 captures (or records) the positive result (no "anomaly") for the updated data in one or more of the profile result table (see, e.g., Table 7) and the target source batch data table 855. In certain embodiments, the positive result can be captured in one or more other databases.

If, at step s1103, database server 825 determines that the updated data fails to conform to one or more pre-defined parameters or if, at step s1105, database server 825 determines that the updated data fails to conform to one or more rule-based logic thresholds, then process 1100 proceeds to step s1107, where database server 825 captures (or records) the negative result (data "anomaly") for the updated data in one or more of the profile result table (see, e.g., Table 7) and the target source batch data table 855. In certain embodiments, the negative result can be captured in one or more other databases.

Based on the detected failure to conform to the pre-defined parameter(s) and/or the rule-based logic threshold(s), database server 825, at step s1108, refreshes data visualization application 830 to include an additional listing for a data anomaly that is detected at step s1103 or step s1105. In one or more exemplary implementations, database server 825 also issues one or more review actions, such as an anomaly rule action via data visualization application 830, FDC 845, and/or UI 840. In certain embodiments, the review actions can include notifications to one or more user accounts associated with SMEs and/or information technology systems and operations (ITSO) entities. Additionally, the refresh of step s1108 can include the threshold calibration described with reference to FIGS. 2 and 3.

Figure 12:
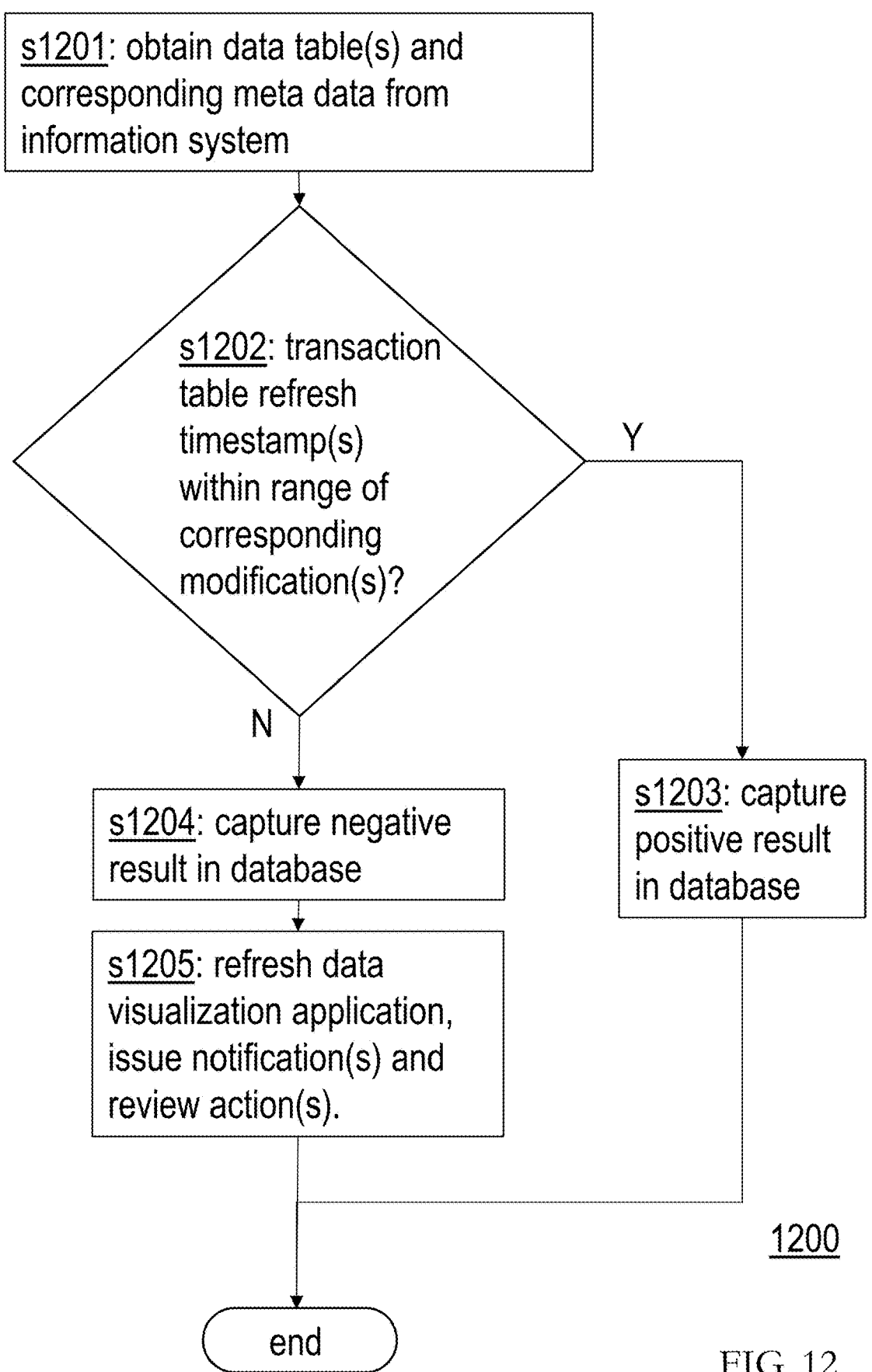
FIG. 12 is a flow diagram illustrating a data staleness verification process for the data quality validation system of FIG. 8 according to one or more exemplary implementations of the present disclosure.

FIG. 12 is a flow diagram illustrating a data staleness verification process 1200 for data quality validation system 800 according to one or more exemplary implementations of the present disclosure. In one or more exemplary implementations, process 1200 is executed periodically in connection with one or more of information system A 490-1 and information system B 490-2 to ensure data quality. In certain embodiments, process 1200 can be executed daily in conjunction with, or upon completion of, process 900.

As illustrated in FIG. 12, process 1200 initiates with step s1201, where database server 825 retrieves table execution details, metadata, and corresponding data tables from one or more of information system A 490-1 and information system B 490-2. In one or more exemplary implementations, the metadata includes one or more latest modification timestamps corresponding to each of one or more data tables obtained from information system A 490-1 and/or information system B 490-2.

Next, at step s1202, database server 825 obtains one or more transaction tables corresponding to the data tables obtained from information system A 490-1 and/or information system B 490-2. In one or more exemplary embodiments, the one or more transaction tables comprise data on underlying transactions associated with the data contained in the data tables obtained at step s1201. Database server 825 compares one or more timestamps associated with one or more transaction tables to corresponding one or more latest table refresh timestamps and/or latest modification timestamps associated with a corresponding one or more of the data tables obtained from information system A 490-1 and/or information system B 490-2. In one or more exemplary embodiments, database server 825 determines whether a refresh timestamp and/or a modification timestamp associated with a data table is within a predetermined time period (or range) from a timestamp associated with a transaction table. In certain embodiments, the predetermined time period can be 48 hours when process 1200 is executed on a Tuesday to a Friday during a business week and 96 hours when process 1200 is executed on a Monday during a business week. A 24-hour period can be added to the predetermined time period for any holidays preceding the execution of process 1200. Additionally, the predetermined time period can be adjusted based on execution frequency of process 1200 and staleness sensitivity for the data.

If database server 825 determines that the timestamps are within range from each other ("Y"), process 1200 concludes with step s1203, where database server 825 captures (or records) the positive result (no "anomaly") for the transaction table(s) and the corresponding data table(s) in one or more of a profile result table (see, e.g., Table 7) and the data table(s) at information system A 490-1 and/or information system B 490-1. In certain embodiments, the positive result can be captured in one or more other databases.

If database server 825 determines that the timestamps are not within range from each other ("N"), then process 1200 proceeds to step s1204, where database server 825 captures (or records) the negative result (data "anomaly") for the transaction table(s) and the corresponding data table(s) in one or more of the profile result table (see, e.g., Table 7) and the data table(s) at information system A 490-1 and/or information system B 490-1. In certain embodiments, the negative result can be captured in one or more other databases.

Based on the detected data staleness, database server 825, at step s1205, refreshes data visualization application 830 to include an additional listing for a data anomaly that is detected at step s1202. In one or more exemplary implementations, database server 825 also issues one or more review actions, such as an anomaly rule action via data visualization application 830, FDC 845, and/or UI 840. In certain embodiments, the review actions can include notifications to user accounts associated with SMEs and/or ITSO entities. Additionally, the refresh of step s1205 can include the threshold calibration described with reference to FIGS. 2 and 3.

Figure 13:
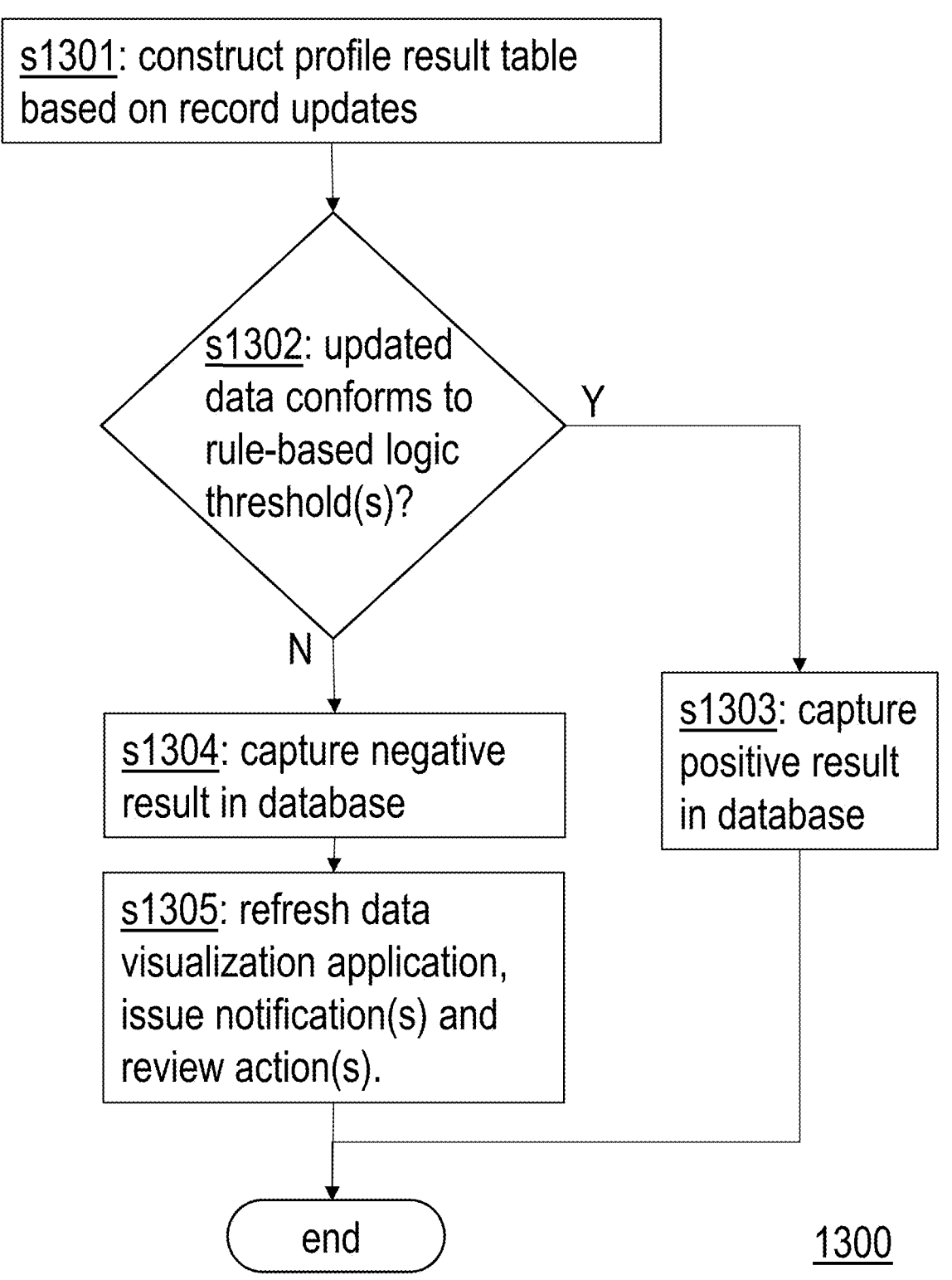
FIG. 13 is a flow diagram illustrating a data update execution timeliness verification process for the data quality validation system of FIG. 8 according to one or more exemplary implementations of the present disclosure.

FIG. 13 is a flow diagram illustrating a data update execution timeliness verification process 1300 for data quality validation system 800 according to one or more exemplary implementations of the present disclosure. In one or more exemplary implementations, process 1300 is executed upon execution of one or more iterations of process 1000 to ensure data quality and timeliness of process 1000.

As shown in FIG. 13, process 1300 initiates with step s1301, where database server 825 retrieves record updates (e.g., updates to target source batch data table 855) from a latest iteration of process 1000 and constructs a profile result table (see, e.g., Table 7) comprising the latest updated data.

Next, at step s1302, database server 825 determines whether the updated data conforms to one or more rule-based logic thresholds. In certain embodiments, the one or more rule-based logic thresholds can comprise one or more z-score logic thresholds or the like.

At steps s1302, if database server 825 determines that the updated data conforms to the rule-based logic threshold(s), then process 1300 concludes with step s1303, where database server 825 captures (or records) the positive result (no "anomaly") for the updated data in one or more of the profile result table (see, e.g., Table 7) and the target source batch data table 855. In certain embodiments, the positive result can be captured in one or more other databases.

If, at step s1302, database server 825 determines that the updated data fails to conform to one or more rule-based logic thresholds, then process 1300 proceeds to step s1304, where database server 825 captures (or records) the negative result (data "anomaly") for the updated data in one or more of the profile result table (see, e.g., Table 7) and the target source batch data table 855. In certain embodiments, the negative result can be captured in one or more other databases.

Based on the detected failure to conform to the rule-based logic threshold(s), database server 825, at step s1305, refreshes data visualization application 830 to include an additional listing for a data anomaly that is detected at step s1302. In one or more exemplary implementations, database server 825 also issues one or more review actions, such as an anomaly rule action via data visualization application 830, FDC 845, and/or UI 840. In certain embodiments, the review actions can include notifications to user accounts associated with SMEs and/or ITSO entities. Additionally, the refresh of step s1305 can include the threshold calibration described with reference to FIGS. 2 and 3.

Additional Examples

Example 4

Figure 14:
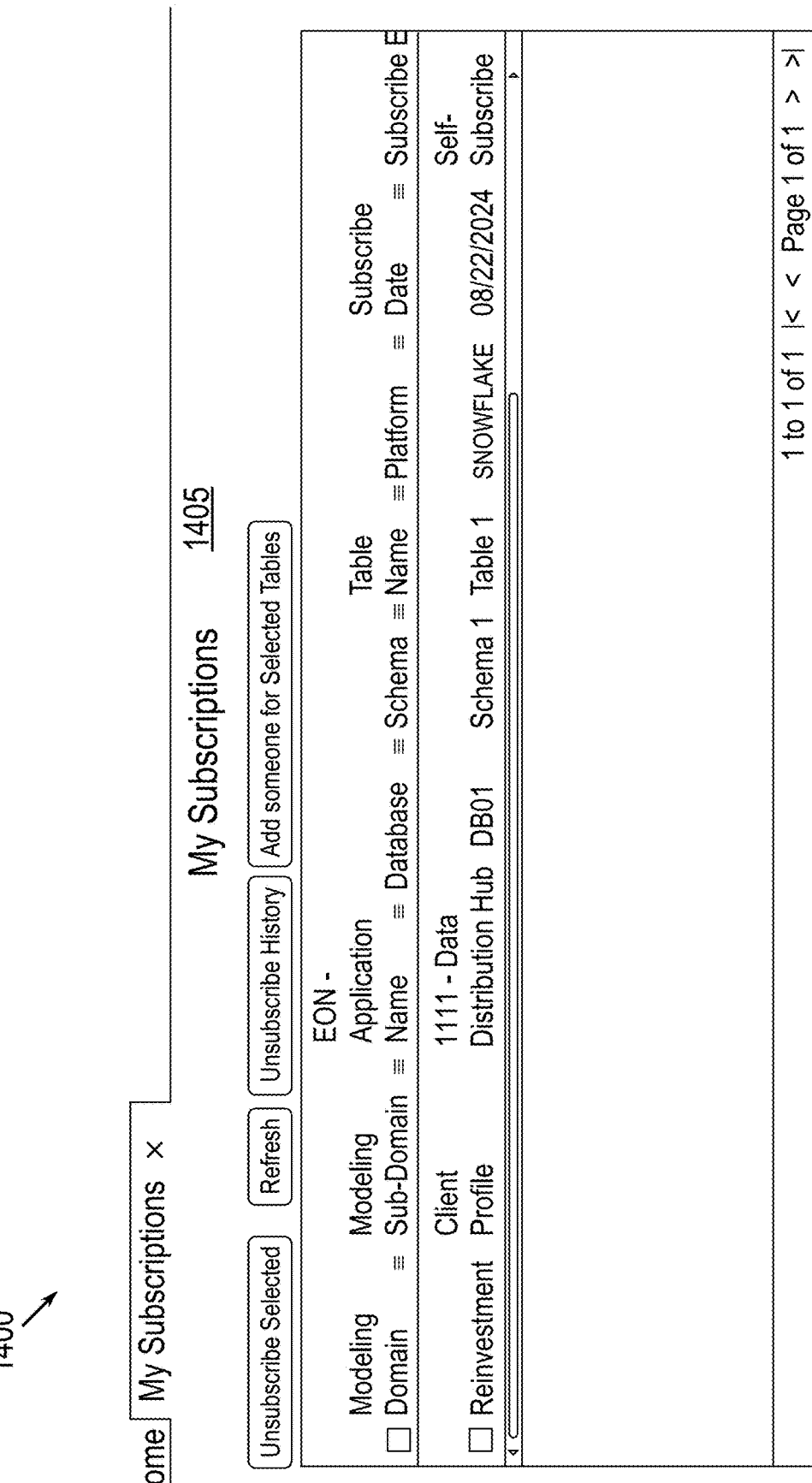
FIG. 14 is an illustration of a GUI for presenting subscriptions to data tables according to one or more example implementations of the present disclosure.

FIG. 14 is an illustration of a GUI 1400 for presenting subscriptions to data tables that are provided via information system(s) 490, cloud data server 820, and database server 825 to a user (e.g., operator 430 at computing apparatus 401). As illustrated FIG. 14, GUI 1400 includes a table 1405 listing all of the data tables to which a user has subscribed, the listing including columns denoting "Modeling Domain," "Modeling Sub-Domain," "Application Name," "Database," "Schema," "Table Name," "Platform," "Subscribed Date," and "Subscribed By." In the Example shown in FIG. 14, a listing for the table includes the following entries for the respective columns: "Reinvestment," "Client Profile," "Data Distribution Hub," "DBO1," "Schema 1," "Table 1," "Snowflake," "8/22/2024," and "Self-Subscribed." In one or more exemplary implementations, GUI 1400 is provided via UI 840 and DQ notifications, for example, the notifications issued at steps s1108, s1205, and s1305 in processes 1100, 1200, and 1300, respectively, can be forwarded to all subscribers of a data table (e.g., user accounts with subscriptions to the data table) associated with a detected data anomaly.

Figure 15:
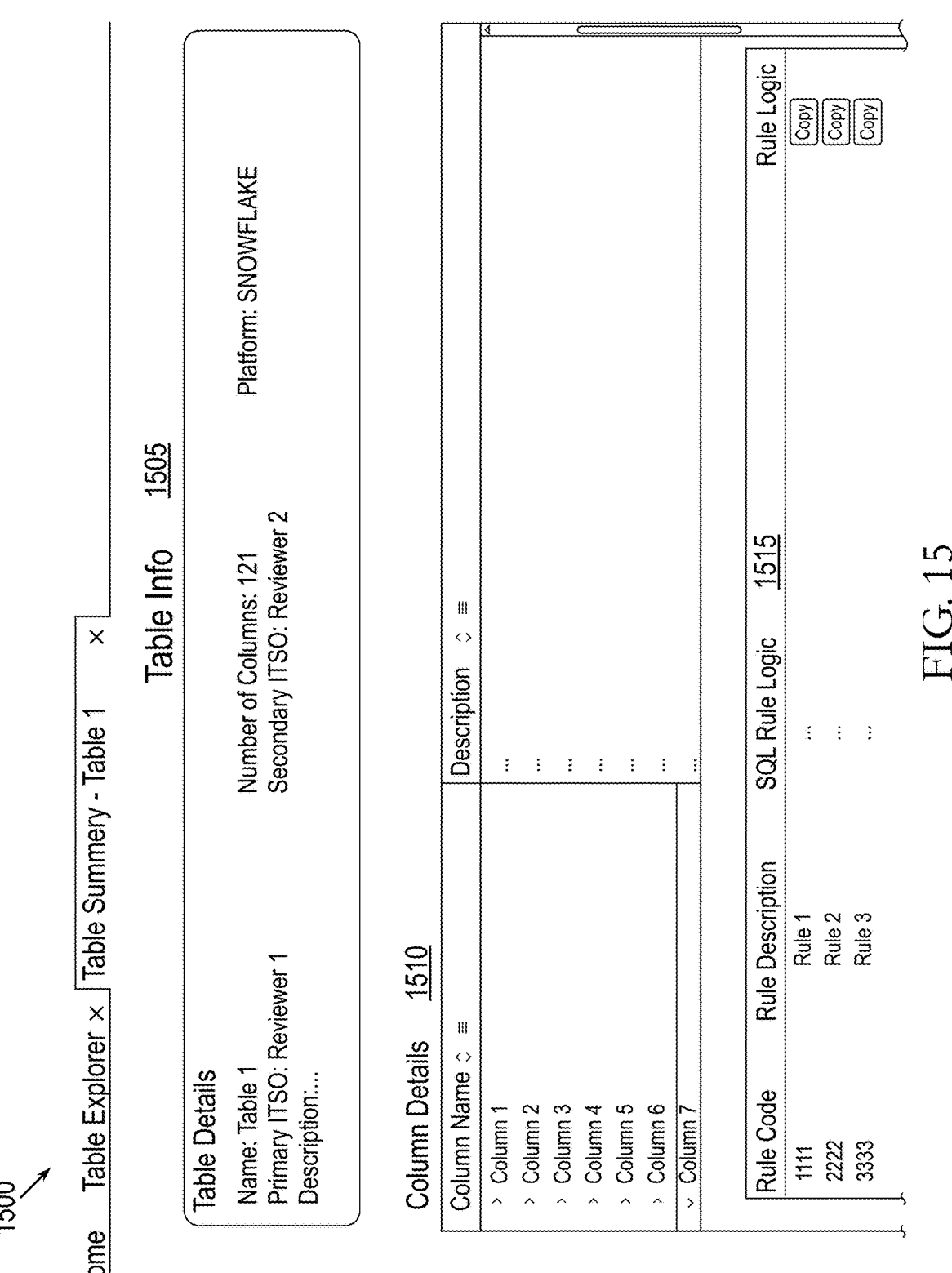
FIG. 15 is an illustration of a GUI for presenting a data table information page for a particular data table according to one or more example implementations of the present disclosure.

FIG. 15 is an illustration of a GUI 1500 for presenting a data table information page for a particular data table that is provided via information system(s) 490, cloud data server 820, and database server 825 to a user (e.g., operator 430 at computing apparatus 401). As illustrated FIG. 15, GUI 1500 includes a table information portion 1505 listing details regarding a selected table (e.g., "Table 1" in GUI 1400), including, without limitation, "Name," "Number of Columns," "Platform," "Primary ITSO," "Secondary ITSO," and "Description." The table information portion 1505 provides general information regarding a selected table. GUI 1500 further includes a "Column Details" portion 1510, which provides a listing of all of the columns included in the data table. Each listing of the columns in portion 1510 includes a selection toggle for displaying additional details regarding the column. As illustrated in FIG. 15, "Column 17" is selected and an expanded display area 1515 shows a listing of rules that are applicable to the selected column. The listing of rules in display area 1515 includes, without limitation, a listing of the "Rule Code," "Rule Description," and "SQL Rule Logic" for each rule that is applicable to the selected column at portion 1510. In one or more exemplary implementations, the information provided in GUI 1500 for each data table is maintained at system 800 according to a "card" system, where each "card" comprises the information and where, for example, the column and rule information provided in display area 1515 is maintained at the "card" and associated with the information shown in Table 7 of the rules set 810. Additionally, a creator and/or operator of a data table can determine the active and inactive rules, which are applied in GUI 1500 accordingly. Thus, a subscriber (user subscribing to a data table) accessing GUI 1500, for example via GUI 1400, can receive information of the subscribed data table with the DQ rules set by the creator and/or operator of the data table. As shown in FIG. 15, each "SQL Rule Logic" includes a "Copy" button to allow a user to copy the instructions for applying the rule to any column of any data table. Advantageously, rule-based data quality assurance is decentralized by providing users access and means to apply DQ rule logic across data tables, including data tables to which the users are subscribed.

Figure 16:
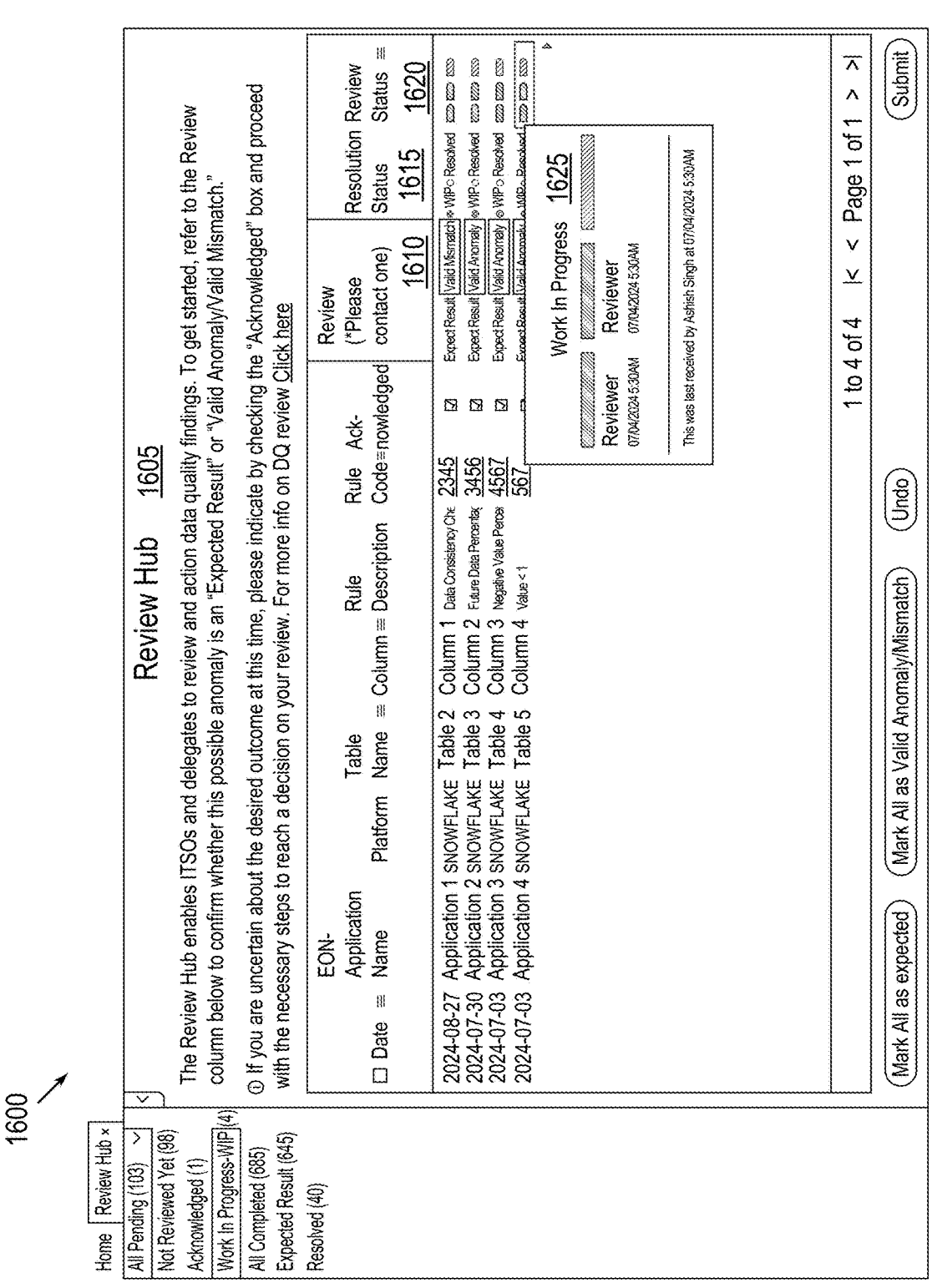
FIG. 16 is an illustration of a GUI for presenting a review screen for detected data anomalies associated with data tables according to one or more example implementations of the present disclosure.

FIG. 16 is an illustration of a GUI 1600 for presenting a review screen for detected data anomalies associated with data tables that are provided via information system(s) 490, cloud data server 820, and database server 825 to a user (e.g., operator 430 at computing apparatus 401). In one or more exemplary implementations, GUI 1600 is provided via data visualization application 830, FDC 845, and/or UI 840 and detected data anomalies are added to the listing in GUI 1600 upon refreshing the data visualization application 840, for example, at steps s1108, s1205, and s1305 of processes 1100, 1200, and 1300, respectively. As illustrated FIG. 16, GUI 1600 includes a "Review Hub" display portion 1605 that includes a listing of all detected data anomalies assigned to a reviewer, for example, an operator 430 at computing apparatus 401. The reviewer can be an SME and/or ITSO entity. Each listing of the detected data anomalies in display portion 1605 includes, without limitation, the "Date" the data anomaly was detected, the corresponding "Application Name," "Platform," "Table Name," "Column," "Rule Description," and "Rule Code." FIG. 16 illustrates a number of example rules, which include, without limitation, "Data Consistency Check," "Future Date Percentage," "Negative Value Percentage," and "Value <1."

Display portion 1605 further includes input column 1610 for assigning a "Review" result for each listing: "Expected Result" or "Valid Mismatch/Anomaly." Thus, a reviewer can designate a detected data anomaly as a "false positive" by selecting "Expected Result" or confirm that a detected data anomaly is a "Valid Mismatch/Anomaly." In one or more exemplary implementations, data points associated with a confirmed data anomaly, or detected anomalies marked "Valid Mismatch/Anomaly," are excluded from ongoing and/or subsequent trend and anomaly analyses, and adjustments to system 800—for example, threshold calibrations as described with reference to FIGS. 2 and 3, upward/downward anomaly detections, anomaly detection sensitivities, or the like, based on statistical and/or ML models.

Display portion 1605 also includes a "Resolution Status" indication column 1615 that corresponds to a "Review Status" indication column 1620. FIG. 16 illustrates an example of a fourth listing on the Review Status column 1620 being selected and a "Work In Progress" window 1625 being displayed to indicate a "Reviewer" having "Acknowledged" and completed an "Initial Review [Complete]." The listing is "Pending [Final] Resolution" and, accordingly, the "Resolution Status" column 1615 indicates work in progress "WIP" for the listed item. According to one or more exemplary implementations, "Resolution Status" column 1615 would indicate "Resolved" instead of "WIP" upon a reviewer confirming final "Resolution," for example, in window 1625.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-*b*). Description of elements with references to the base reference numerals (e.g., 210) also refer to all specific examples with such letter suffixes (e.g., 210-*b*), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A system, comprising:
   an information system;
   a first computing apparatus; and
   a second computing apparatus adapted to maintain a
   source data table and a batch data table, wherein
   the first computing apparatus is adapted to:
   periodically update the source data table with updated
   system data at a first regular time interval, comprising:
   obtaining, from the second computing apparatus, the
   updated system data and the source data table;
   identifying one or more of a new record, a changed
   record, and an expired record in the updated
   system data obtained from the database server;
   when a new record is identified, inserting the new
   record to the source data table;
   when a changed record is identified, updating the
   changed record in the source data table; and
   when an expired record is identified, deleting the
   expired record from the source data table;
   periodically update, in an iterative or recursive manner
   in conjunction with the periodically updating of the
   source data table at the first regular time interval, the
   batch data table with the updated system data at a
   second regular time interval, comprising:
   obtaining, from the second computing apparatus, one
   or more delta records in the updated system data
   according to a latest timestamp and the batch data
   table;
   comparing the one or more delta records obtained
   from the database server to one or more corresponding target table records in the batch data
   table;

when the comparing identifies a delta between the one or more delta records and the batch data table, inserting the one or more delta records to the batch data table;

when the comparing fails to identify a correspondence between the one or more delta records and the batch data table, excluding the one or more delta records from the batch data table; and updating the latest timestamp for a next iteration of the updating of the batch data table;

the second computing apparatus is adapted to:

obtain, from the information system, one or more data tables and metadata corresponding to the one or more data tables;

obtain one or more transaction tables corresponding to the one or more data tables;

determine whether a refresh timestamp or a modification timestamp associated with the one or more data tables is within a predetermined time period from a timestamp associated with the one or more transaction tables;

when it is determined that the refresh timestamp or the modification timestamp associated with the one or more data tables is within the predetermined time period from the timestamp associated with the one or more transaction tables, record a timestamp positive result in a profile result table; and when it is determined that the refresh timestamp or the modification timestamp associated with the one or more data tables is not within the predetermined time period from the timestamp associated with the one or more transaction tables, record a timestamp negative result in the profile result table and update a data visualization application for reviewing the timestamp negative result, wherein the data visualization application comprises a graphical user interface that is accessible using a third computing apparatus for reviewing and confirming the timestamp negative result, and the first regular time interval is greater than the second regular time interval.

2. The system of claim 1, wherein one or more data points associated with a confirmed negative result is excluded from a data trend calculation at the second computing apparatus.

3. The system of claim 1, wherein the first regular time interval is one week, the second regular time interval is twenty four (24) hours, and the predetermined time period is between forty eight (48) hours and ninety six (96) hours.

4. The system of claim 1, wherein the second computing apparatus is further adapted to:

construct the profile result table based on one or more completed record updates in a latest iteration of the updating of the batch data table;

determine whether one or more parameters are defined for updated data included in the one or more completed record updates;

when it is determined that one or more parameters are defined for the updated data, determine whether the updated data conforms to the one or more defined parameters;

when it is determined that the updated data conforms to the one or more defined parameters, record a defined parameter positive result in the profile result table;

when it is determined that the updated data fails to conform to the one or more defined parameters, record a defined parameter negative result in the profile result table and update the data visualization application for reviewing the defined parameter negative result;

when it is determined that no parameters are defined for the updated data, determine whether the updated data conforms to one or more rule-based logic thresholds;

when it is determined that the updated data conforms to the one or more rule-based logic thresholds, record a logic threshold positive result in the profile result table; and when it is determined that the updated data fails to conform to the one or more rule-based logic thresholds, record a logic threshold negative result in the profile result table and update the data visualization application for reviewing the logic threshold negative result.

5. The system of claim 1, wherein the second computing apparatus is further adapted to:

construct the profile result table based on one or more completed record updates in a latest iteration of the updating of the batch data table;

determine whether the updated data conforms to one or more rule-based logic thresholds;

when it is determined that the updated data conforms to the one or more rule-based logic thresholds, record a logic threshold positive result in the profile result table; and when it is determined that the updated data fails to conform to the one or more rule-based logic thresholds, record a logic threshold negative result in the profile result table and update the data visualization application for reviewing the logic threshold negative result.

6. The system of claim 5, wherein the one or more rule-based logic thresholds comprise a z-score logic threshold.

7. The system of claim 1, wherein the second computing apparatus is further adapted to:

upon recording the timestamp negative result in the profile result table, issue a notification to one or more user accounts with a subscription to a data table associated the timestamp negative result.

8. A method, comprising:

periodically updating, at a first computing apparatus, a source data table maintained at a second computing apparatus with updated system data at a first regular time interval, comprising:

obtaining, from the second computing apparatus, the updated system data and the source data table;

identifying one or more of a new record, a changed record, and an expired record in the updated system data obtained from the database server;

when a new record is identified, inserting the new record to the source data table;

when a changed record is identified, updating the changed record in the source data table; and when an expired record is identified, deleting the expired record from the source data table;

periodically updating, in an iterative or recursive manner at the first computing apparatus in conjunction with the periodically updating of the source data table at the first regular time interval, a batch data table maintained at the second computing apparatus with the updated system data at a second regular time interval, comprising:

obtaining, from the second computing apparatus, one or more delta records in the updated system data according to a latest timestamp and the batch data table;

comparing the one or more delta records obtained from the database server to one or more corresponding target table records in the batch data table;

when the comparing identifies a delta between the one or more delta records and the batch data table, inserting the one or more delta records to the batch data table;

when the comparing fails to identify a correspondence between the one or more delta records and the batch data table, excluding the one or more delta records from the batch data table; and updating the latest timestamp for a next iteration of the updating of the batch data table;

obtaining, at the second computing apparatus from the information system, one or more data tables and metadata corresponding to the one or more data tables;

obtaining, at the second computing apparatus, one or more transaction tables corresponding to the one or more data tables;

determining, at the second computing apparatus, whether a refresh timestamp or a modification timestamp associated with the one or more data tables is within a predetermined time period from a timestamp associated with the one or more transaction tables;

when it is determined that the refresh timestamp or the modification timestamp associated with the one or more data tables is within the predetermined time period from the timestamp associated with the one or more transaction tables, recording a timestamp positive result in a profile result table; and when it is determined that the refresh timestamp or the modification timestamp associated with the one or more data tables is not within the predetermined time period from the timestamp associated with the one or more transaction tables, recording a timestamp negative result in the profile result table and updating a data visualization application for reviewing the timestamp negative result, wherein the data visualization application comprises a graphical user interface that is accessible using a third computing apparatus for reviewing and confirming the timestamp negative result, wherein the first regular time interval is greater than the second regular time interval.

9. The method of claim 8, wherein one or more data points associated with a confirmed negative result is excluded from a data trend calculation at the second computing apparatus.

10. The method of claim 8, wherein the first regular time interval is one week, the second regular time interval is twenty four (24) hours, and the predetermined time period is between forty eight (48) hours and ninety six (96) hours.

11. The method of claim 8, further comprising:

constructing, at the second computing apparatus, the profile result table based on one or more completed record updates in a latest iteration of the updating of the batch data table;

determining, at the second computing apparatus, whether one or more parameters are defined for updated data included in the one or more completed record updates;

when it is determined that one or more parameters are defined for the updated data, determining whether the updated data conforms to the one or more defined parameters;

when it is determined that the updated data conforms to the one or more defined parameters, recording a defined parameter positive result in the profile result table;

when it is determined that the updated data fails to conform to the one or more defined parameters, recording a defined parameter negative result in the profile result table and updating the data visualization application for reviewing the defined parameter negative result;

when it is determined that no parameters are defined for the updated data, determining whether the updated data conforms to one or more rule-based logic thresholds;

when it is determined that the updated data conforms to the one or more rule-based logic thresholds, recording a logic threshold positive result in the profile result table; and when it is determined that the updated data fails to conform to the one or more rule-based logic thresholds, recording a logic threshold negative result in the profile result table and updating the data visualization application for reviewing the logic threshold negative result.

12. The method of claim 8, further comprising:

constructing, at the second computing apparatus, the profile result table based on one or more completed record updates in a latest iteration of the updating of the batch data table;

determining, at the second computing apparatus, whether the updated data conforms to one or more rule-based logic thresholds;

when it is determined that the updated data conforms to the one or more rule-based logic thresholds, recording a logic threshold positive result in the profile result table; and when it is determined that the updated data fails to conform to the one or more rule-based logic thresholds, recording a logic threshold negative result in the profile result table and updating the data visualization application for reviewing the logic threshold negative result.

13. The method of claim 12, wherein the one or more rule-based logic thresholds comprise a z-score logic threshold.

14. The method of claim 8, further comprising:

upon recording the timestamp negative result in the profile result table, issuing, at the second computing apparatus, a notification to one or more user accounts with a subscription to a data table associated the timestamp negative result.

* * * * *